United States Patent
Soga et al.

(10) Patent No.: US 8,385,486 B2
(45) Date of Patent: Feb. 26, 2013

(54) DIVERSITY RECEIVING APPARATUS AND DIVERSITY RECEIVING METHOD

(75) Inventors: Shigeru Soga, Hyogo (JP); Shunsuke Sakai, Osaka (JP)

(73) Assignee: Panasonic Corporation, Osaka (JP)

( * ) Notice: Subject to any disclaimer, the term of this patent is extended or adjusted under 35 U.S.C. 154(b) by 526 days.

(21) Appl. No.: 12/307,016

(22) PCT Filed: Apr. 17, 2007

(86) PCT No.: PCT/JP2007/058321
§ 371 (c)(1),
(2), (4) Date: Jul. 19, 2010

(87) PCT Pub. No.: WO2008/007490
PCT Pub. Date: Jan. 17, 2008

(65) Prior Publication Data
US 2010/0284492 A1    Nov. 11, 2010

(30) Foreign Application Priority Data
Jul. 12, 2006    (JP) .................................. 2006-191719

(51) Int. Cl.
*H04L 1/02* (2006.01)
(52) U.S. Cl. ...................................................... 375/347
(58) Field of Classification Search .................. 375/260, 375/316, 340, 346–347, 349; 455/133–135, 455/137, 140, 272–273
See application file for complete search history.

(56) References Cited

U.S. PATENT DOCUMENTS

| | | | |
|---|---|---|---|
| 7,310,503 B2* | 12/2007 | Ido | ................................ 455/140 |
| 7,818,635 B2* | 10/2010 | Tsukio et al. | .................. 714/708 |
| 8,059,770 B2* | 11/2011 | Imagawa et al. | ............... 375/347 |
| 2004/0002307 A1 | 1/2004 | Mizoguchi et al. | |
| 2006/0166634 A1 | 7/2006 | Ido | |
| 2009/0097576 A1* | 4/2009 | Adachi et al. | .................. 375/260 |
| 2009/0097577 A1* | 4/2009 | Adachi et al. | .................. 375/260 |

FOREIGN PATENT DOCUMENTS

| | | |
|---|---|---|
| EP | 1 363 411 | 11/2003 |
| EP | 1 557 962 | 7/2005 |
| JP | 2003-244043 | 8/2003 |

(Continued)

OTHER PUBLICATIONS

International Search Report issued Jul. 24, 2007 in the International (PCT) Application No. PCT/JP2007/058321.

*Primary Examiner* — Khanh C Tran
(74) *Attorney, Agent, or Firm* — Wenderoth, Lind & Ponack, L.L.P.

(57) ABSTRACT

There is provided a diversity receiving apparatus, comprising: a first branch (5) for decoding a frequency multiplexing signal in which a carrier group has been multiplexed, thereby outputting a first data carrier and a first pilot carrier; a second branch (6) for decoding a frequency multiplexing signal in which a carrier group has been multiplexed, thereby outputting a second data carrier and a second pilot carrier; a timing adjusting unit (7) for synchronizing processing timing for a carrier group decoded by the first branch (5) and a carrier group decoded by the second branch (6); a combining/selecting unit (8) for combining/selecting the first data carrier and/or the second data carrier; and a control unit (10) for controlling stopping and starting operation of at least one of the first branch (5) and the second branch (6) according to at least one of a receiving status of the first branch (5) and a receiving status of second branch (6).

13 Claims, 12 Drawing Sheets

FOREIGN PATENT DOCUMENTS

| | | |
|---|---|---|
| JP | 2003-333012 | 11/2003 |
| JP | 2004-242191 | 8/2004 |
| JP | 2004-320528 | 11/2004 |
| JP | 3642784 | 2/2005 |
| JP | 2006-246364 | 9/2006 |
| WO | 2004/038956 | 5/2004 |

* cited by examiner

| C1<br>C2 | 1 | 2 | 3 |
|---|---|---|---|
| 1 | $\dfrac{C1+C2}{2}$ | $\dfrac{2 \times C1+C2}{3}$ | $\dfrac{3 \times C1+C2}{4}$ |
| 2 | $\dfrac{C1+2 \times C2}{3}$ | $\dfrac{C1+C2}{2}$ | $\dfrac{3 \times C1+2 \times C2}{5}$ |
| 3 | $\dfrac{C1+3 \times C2}{4}$ | $\dfrac{2 \times C1+3 \times C2}{5}$ | $\dfrac{C1+C2}{2}$ |

DIVERSITY RECEIVING APPARATUS AND DIVERSITY RECEIVING METHOD

TECHNICAL FIELD

The present invention relates to a diversity receiving apparatus and a diversity receiving method of receiving a frequency multiplexing signal, especially the rectangular frequency division multiplex signal (hereinafter an "OFDM signal") used for ground digital broadcasting.

BACKGROUND ART

In Japan, terrestrial digital broadcasting according to the ISDB-T method has been started from 2003. In every country in the world (Europe, North America, South America, and the Asian bloc) analog broadcasting has been digitized, and ground digital broadcasting is going to be started. In many of the countries, technology which is equivalent to or based on the ISDB-T method in Japan is used. Especially, the OFDM signal that orthogonal multiplexing along a frequency axis has been performed on many carriers is used.

The OFDM signal has the feature strong against a multipass. In order to further improve quality of reception, performing diversity receiving for every carrier multiplexed on the frequency axis is proposed (for example, See Document 1).

In order to perform diversity receiving for every carrier, the diversity receiving apparatus needs to be provided with a plurality of branches.
Depending on an electric wave status, receiving status in any of the plurality of branches may be deteriorated.

Using carriers decoded by a branch in a bad receiving status for performing combination for every carrier in diversity receiving causes deteriorating receiving accuracy by contraries.

Keeping decoding operation of the branch in the bad receiving status as it is causes not only deteriorating the receiving accuracy but also arising unnecessary power consumption.

When the decoding operation of the branch in the bad receiving status is resumed after having stopped the decoding operation, data stored when stopping may cause malfunction of the branch. In this case, it takes extra time to obtain enough receiving accuracy after resuming the decoding operation of the branch.

[Document 1] Japanese Patent Application laid-open on No. 2004-242191

DISCLOSURE OF INVENTION

Problem(s) to be Solved by Invention

In view of the above, an object of the present invention is to provide a diversity receiving apparatus and a diversity receiving method capable of preventing the deterioration of the receiving accuracy caused by diversity receiving and also reducing power consumption thereof.

Means for Solving Problem(s)

A first aspect of the present invention provides a diversity receiving apparatus, comprising: a first branch operable to decode a frequency multiplexing signal in which a carrier group including a data carrier and a pilot carrier has been multiplexed, thereby outputting a first data carrier and a first pilot carrier; a second branch operable to decode a frequency multiplexing signal in which a carrier group including a data carrier and a pilot carrier has been multiplexed, thereby outputting a second data carrier and a second pilot carrier; a timing adjusting unit operable to synchronize processing timing for a carrier group decoded by the first branch and a carrier group decoded by the second branch; a combining/selecting unit operable to combine/select the first data carrier and/or the second data carrier; and a control unit operable to control stopping and starting operation of at least one of the first branch and the second branch according to at least one of a receiving status of the first branch and a receiving status of second branch.

This arrangement enables to reduce contribution degree of a branch in a receiving status deteriorating quality of reception to the diversity receiving. As a result, deterioration of the quality of reception in the diversity receiving can be prevented. Controlling stopping and starting operation of the branch in a bad receiving status enables to realize reduction of power consumption and simplification of operation.

A second aspect of the present invention provides a diversity receiving apparatus, in addition to the first aspect, further comprising: a first judging unit operable to judge the receiving status of the first branch to output a first judgment result to the control unit; and a second judging unit operable to judge the receiving status of the second branch to output a second judgment result to the control unit.

This arrangement enables to comprehend variation of each receiving status of the plurality of branches provided with the diversity receiving apparatus.

A third aspect of the present invention provides a diversity receiving apparatus, in addition to the second aspect, wherein the first judging unit judges whether the first branch is a stopping branch or an operating branch according to the receiving status of the first branch, and wherein the second judging unit judges whether the second branch is a stopping branch or an operating branch according to the receiving status of the second branch.

With this arrangement, each receiving status of the plurality of branches is comprehended, thereby adequately distinguishing a branch whose demodulation result is used for the diversity receiving from a branch whose demodulation result is not used there-for.

A forth aspect of the present invention provides a diversity receiving apparatus, in addition to the third aspect, wherein the control unit performs at least one of: initializing a stored value stored by the stopping branch; and reducing clock signals of the stopping branch.

This arrangement enables to reduce power consumption in a branch not to be used for the diversity receiving. In addition, malfunction when stopping operation and resuming operation can be prevented by initializing the stored value.

A fifth aspect of the present invention provides a diversity receiving apparatus, in addition to the third aspect, wherein the control unit reduces clock signals of the stopping branch after initializing a stored value stored by the stopping branch.

With this arrangement, since reducing the clock signals is performed after initialization, problem of initialization with an inappropriate value hardly occurs.

A sixth aspect of the present invention provides a diversity receiving apparatus, in addition to the third aspect, wherein each of the first branch and the second branch comprises a correcting unit operable to correct an amount of time-frequency off-set with respect to the frequency multiplexing signal, and wherein the control unit reduces clock signals of the stopping branch after initializing a stored value stored by the stopping branch while retaining the amount of time-frequency off-set stored by the stopping branch.

With this arrangement, the amount of time-frequency offset is retained as it is even when initializing the stored value of the stopping branch. Therefore, calculation of the amount of frequency-offset is unnecessary after resuming operation of the stopping branch. For this reason, when resuming the stopping branch is instructed, operation can be resumed in a short time.

A seventh aspect of the present invention provides a diversity receiving apparatus, in addition to any of the forth to sixth aspects, wherein the reducing the clock signals includes stopping the clock signals.

This arrangement enables to remarkably reduce power consumption of the stopping branch.

An eighth aspect of the present invention provides a diversity receiving apparatus, in addition to any of the third to seventh aspects, wherein the first judging unit judges that the first branch is an operating branch when an amplitude value of the first pilot carrier is greater than a predetermined threshold, and the first judging unit judges that the first branch is a stopping branch when the amplitude value is not greater than the predetermined threshold, and wherein the second judging unit judges that the second branch is an operating branch when an amplitude value of the second pilot carrier is greater than a predetermined threshold, and the second judging unit judges that the second branch is a stopping branch when the amplitude value is not greater than the predetermined threshold.

This arrangement enables to easily judge the receiving status of the branches.

A ninth aspect of the present invention provides a diversity receiving apparatus, in addition to any of the third to seventh aspects, wherein the first judging unit calculates an amplitude value of the first pilot carrier at each of a first timing and a second timing after the first timing, thereby judging that the first branch is an operating branch when the amplitude value at the second timing is greater than the sum of the amplitude value at the first timing and a predetermined threshold, and judging that the first branch is a stopping branch when the amplitude value at the second timing is not greater than the sum of the amplitude value at the first timing and the predetermined threshold, and wherein the second judging unit calculates an amplitude value of the second pilot carrier at each of a first timing and a second timing after the first timing, thereby judging that the second branch is an operating branch when the amplitude value at the second timing is greater than the sum of the amplitude value at the first timing and a predetermined threshold, and judging that the second branch is a stopping branch when the amplitude value at the second timing is not greater than the sum of the amplitude value at the first timing and the predetermined threshold.

This arrangement enables to judge the receiving status of the branches considering not only the receiving status at a certain timing but also variation of the receiving status during a fixed period. That is, it is possible to judge the receiving status of the branches considering rapid change of the receiving status caused by phasing, or the like.

A tenth aspect of the present invention provides a diversity receiving apparatus, in addition to any of the third to seventh aspects, wherein the first judging unit calculates an amplitude value of the first pilot carrier at each of a first timing and a second timing after the first timing, thereby judging that the first branch is an operating branch when the amplitude value at the second timing is greater than the amplitude value at the first timing, and judging that the first branch is a stopping branch when the amplitude value at the second timing is not greater than the amplitude value at the first timing, and wherein the second judging unit calculates an amplitude value of the second pilot carrier at each of a first timing and a second timing after the first timing, thereby judging that the second branch is an operating branch when the amplitude value at the second timing is greater than the amplitude value at the first timing, and judging that the second branch is a stopping branch when the amplitude value at the second timing is not greater than the amplitude value at the first timing.

This arrangement enables to judge the receiving status of the branches considering not only the receiving status at a certain timing but also variation of the receiving status during a fixed period.

That is, it is possible to judge the receiving status of the branches considering rapid change of the receiving status caused by phasing, or the like.

An eleventh aspect of the present invention provides a diversity receiving apparatus, in addition to any of the third to seventh aspects, wherein, when a difference between amplitude values of the first pilot carrier and the second pilot carrier is greater than a predetermined threshold, each of the first judging unit and the second judging unit judges that a branch having a less amplitude value between the amplitude values is a stopping branch.

This arrangement enables to judge the receiving status of a certain branch based on receiving statuses of a plurality of branches in addition to the individual receiving status of a certain branch. That is, it is possible to determine a branch to be used for diversity receiving and a branch not to be used for diversity receiving based on the balance of the receiving statuses of the plurality of branches, thereby improving quality of reception of the diversity receiving.

A twelfth aspect of the present invention provides a diversity receiving apparatus, in addition to any of the third to seventh aspects, wherein the first judging unit integrates amplitude values of a predetermined numbers of first pilot carriers, and amplitude values of a predetermined numbers of first data carriers, thereby judging that the first branch is an operating branch when an integrated value of the first pilot carriers is greater than an integrated value of the first data carriers, and judging that the first branch is a stopping branch when the integrated value of the first pilot carriers is not greater than the integrated value of the first data carriers, and wherein the second judging unit integrates amplitude values of a predetermined numbers of second pilot carriers, and amplitude values of a predetermined numbers of second data carriers, thereby judging that the second branch is an operating branch when an integrated value of the second pilot carriers is greater than an integrated value of the second data carriers, and judging that the second branch is a stopping branch when the integrated value of the second pilot carriers is not greater than the integrated value of the second data carriers.

This arrangement enables to judge the receiving status more precisely.

A thirteenth aspect of the present invention provides a diversity receiving apparatus, in addition to any of the first to twelfth aspects, wherein, when the control unit receives an instruction signal for resuming the stopping branch, the control unit releases the initializing after resuming operation of the clock signal based on the instruction signal.

This arrangement enables to prevent malfunction after resuming operation.

Effect of Invention

According to the present invention, operation of a branch in a bad receiving status can be stopped based on judgment of the receiving status for every branch of the diversity receiving apparatus provided with the plurality of branches. Consequently, it is possible not only to reduce power consumption but also to prevent deterioration of quality of reception because it is unnecessary to use the demodulation result of the branch in the bad receiving status for the diversity receiving. That is, appropriate balance between reducing power consumption of the diversity receiving apparatus and improving quality of reception thereof is attained.

DESCRIPTION OF SYMBOLS

Figure 1:
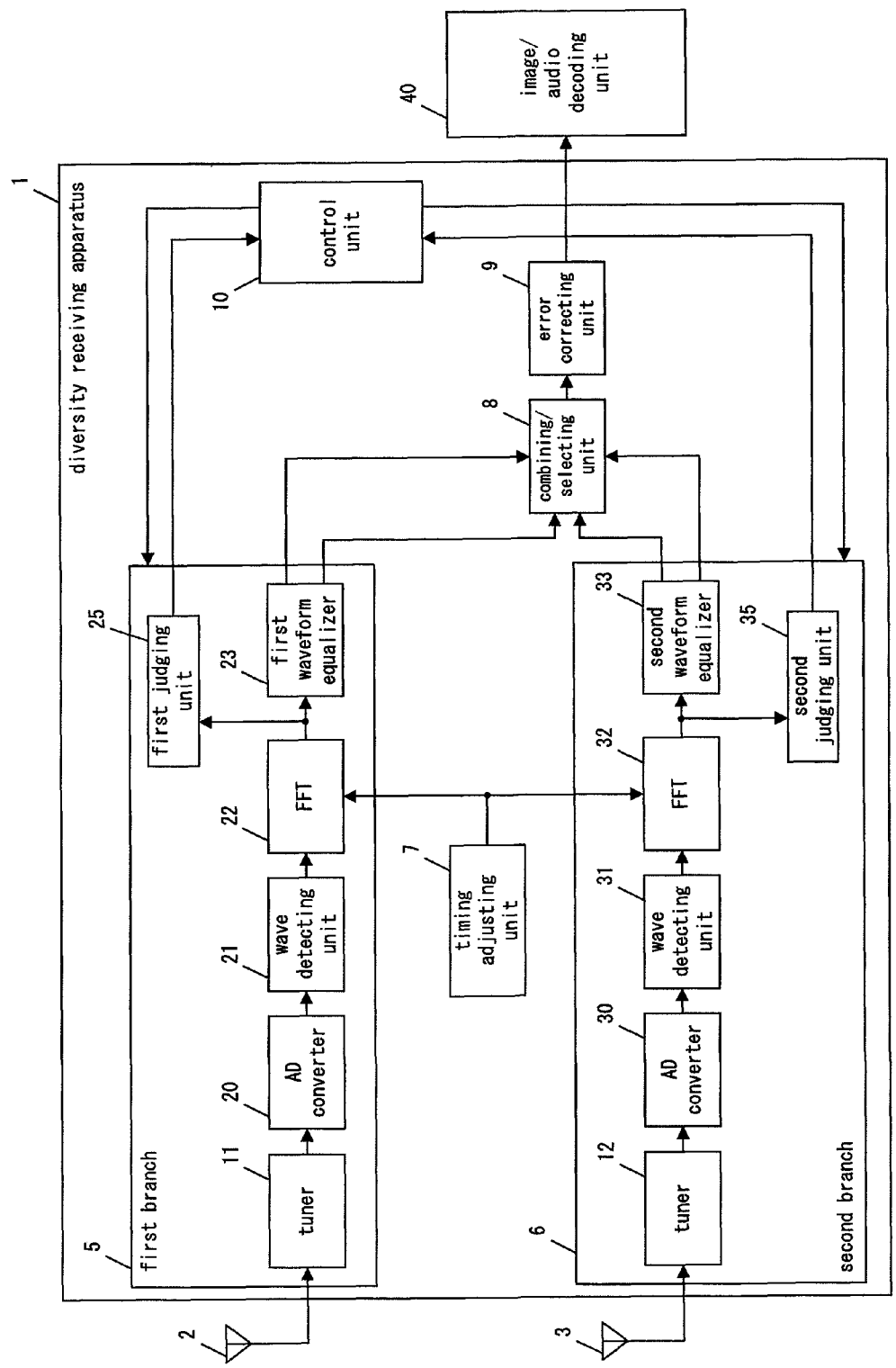
FIG. 1 is block diagram of a diversity receiving apparatus according to Embodiment 1 of the present invention.

1: Diversity receiving apparatus
2, 3: Antenna
5: First branch
6: Second branch
7: Time adjusting unit
8: Combining/selecting unit
9: Error correcting unit
10: Control unit
20, 30: Analog-to-digital converter
21, 31: Detecting unit
22, 32: FFT
23: First waveform equalizer
33: Second waveform equalizer
40: Image/audio decoding unit

BEST MODE FOR CARRYING OUT THE INVENTION

Next, referring to the attached drawings, Embodiments of the present invention will now be explained.

(Embodiment 1)

Embodiment 1 will now be explained referring to FIG. 1 to FIG. 5.

Figure 2:
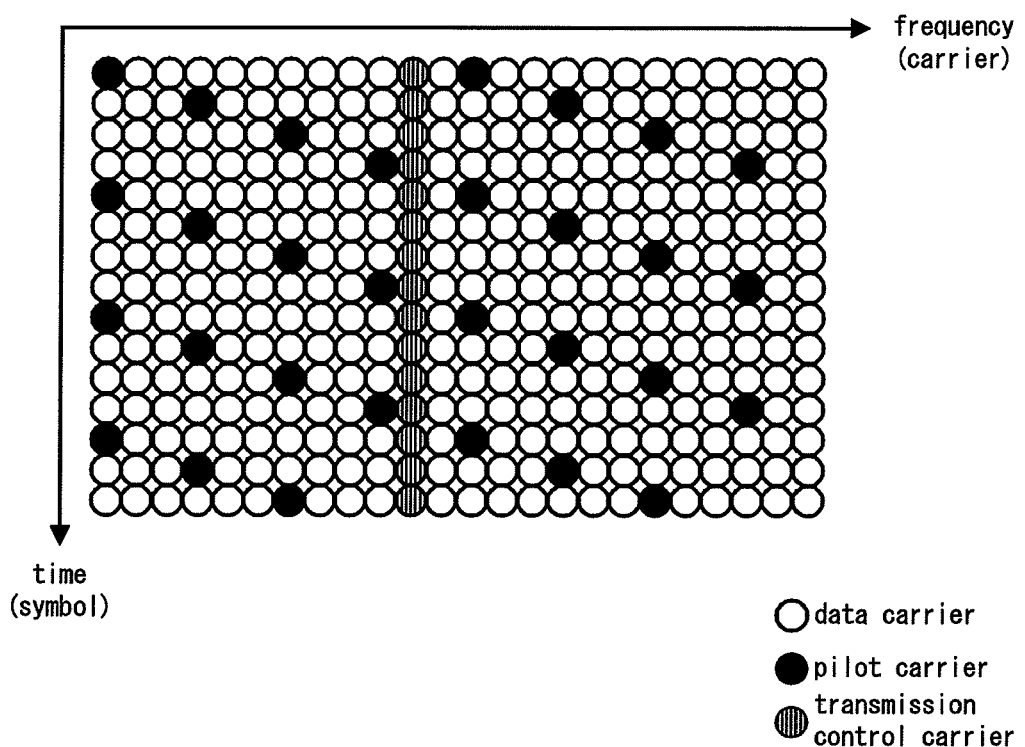
FIG. 2 indicates explanation of an OFDM signal according to Embodiment 1 of the present invention.

FIG. 1 is a block diagram of a diversity receiving apparatus according to Embodiment 1 of the present invention. FIG. 2 indicates explanation of an OFDM signal according to Embodiment 1 of the present invention.

In this specification, with respect to a frequency multiplex signal, an OFDM signal defined in the ISDB-T standard that is a standard for digital terrestrial television services is explained as an example. In the OFDM signal, orthogonal multiplexing along a frequency axis has been performed on a plurality of carriers. The OFDM signal includes data carriers of demodulated image/audio data, pilot carriers for judging a receiving characteristic, and transmission control carriers including information, such as a modulation method. In addition, the OFDM signal is merely an example of the frequency-division multiplexing signal in the present invention. Thus, the frequency-division multiplexing signal of the present invention broadly includes communication signals, such as an FDM signal and an SS-OFDM signal.

(Outline)

A diversity receiving apparatus 1 is provided with: a first branch 5 for receiving and decoding the OFDM signal, thereby outputting a first data carrier and a first pilot carrier; a second branch 6 for receiving and decoding the OFDM signal, thereby outputting a second data carrier and a second pilot carrier; and a combining/selecting unit 8 for combining/selecting unit 8 the first data carrier and the second data carrier. The apparatus is further provided with a timing adjusting unit 7 for synchronizing processing timing for a carrier group decoded by the first branch 5 and a carrier group decoded by the second branch 6; and the control unit 10 for controlling stopping and starting operation of at least one of the first branch 5 and the second branch 6 according to at least one of a receiving status of the first branch 5 and a receiving status of second branch 6.

The combining/selecting unit 8 outputs a calculation result to an error correcting unit 9, and the error correcting unit 9 performs error correction using Viterbi decoding or Reed Solomon decoding.

The first branch 5 and the second branch 6 are respectively provided with: tuners 11 and 12 for receiving a predetermined bandwidth signal from the OFDM signal that is reached to antennas 2 and 3, thereby outputting a received signal; analog-to-digital converters 20 and 30 (indicated with the words of "A/D converter" in Figs.) for converting an analog signal of the received signal into a digital signal of the received signal; detection units 21 and 31 for detecting outputs from the analog-to-digital converters 20 and 30; and Fast Fourier Transform units (hereinafter "FFT") 22 and 32 for converting a signal along to a time axis of outputs from the detection units 21 and 31 into a signal along to a frequency axis.

Herein, the FFTs are examples of elements for performing time-frequency conversion. Alternatively, other elements for performing time-frequency conversion utilizing fractal may be used.

The first branch 5 is further provided with a first judging unit 23 for judging the receiving status of the first branch 5 to output a first judgment result to the control unit 10. The second branch 6 is further provided with and a second judging unit 35 for judging the receiving status of the second branch 6 to output a second judgment result to the control unit 10.

Next, detail of each element will be explained.

(Antenna)

The antennas 2 and 3 receive an OFDM signal. The number, which corresponds to the number of branches, of the antennas 2 and 3 are provided. In FIG. 1, since two branches of the first branch 5 and the second branch 6 are provided, two antennas of antennas 2 and 3 are provided. The antennas may have any kind of form. The distance between the antenna 2 and the antenna 3 preferably has about half-wavelength of the received OFDM signal.

(Tuner)

A tuner 11 is connected to the antenna 2; and a tuner 12 is connected to the antenna 3. Based on the center frequency according to the broadcast bandwidth, both of the tuners select a specific bandwidth of the OFDM signal received by the antennas 2 and 3, and then receive it.

Tuners 11 and 12 output the received OFDM signal to the analog-to-digital converters 20 and 30 as a received signal.

When there is a difference between frequency used by the tuners 11 and 12 and frequency used by the wave detecting units 21 and 31, it is preferable to correct an amount of time-frequency off-set with respect to the frequency multiplexing signal as below-described.

(Analog-to-Digital Converter)

The analog-to-digital converter 20 digitizes the receiving signal from the tuner 11. Similarly, the analog-to-digital converter 30 digitizes the receiving signal from the tuner 12. The analog-to-digital converters 20 and 30 have resolution according to the specification of the diversity receiving apparatus 1.

The analog-to-digital converters 20 and 30 output the digital signal to wave detecting units 21 and 31.

(Detecting Unit)

The first branch 5 and the second branch 6 are respectively provided with the wave detecting units 21 and 31.

The wave detecting units 21 and 31 perform orthogonal detection on the received signal converted into the digital signal. The wave detecting units 21 and 31 output a detected signal to the FFTs 22 and 32.

The wave detecting units 21 and 31 detect the received signal according to synchronous detection or semi-synchronous detection.

(FFT)

Each of the first branch 5 and the second branch 6 is provided with the FFT 22 and the FFT 32, respectively. Each of the FFT 22 and the FFT 32 is just an example of the time-frequency converting unit operable to map signals outputted by the wave detecting units 21 and 31 from a signal along a time axis to a signal along a frequency axis. As long as having a function of converting a signal along a time axis into a signal along a frequency axis, time-frequency converters utilizing fractal and/or time-frequency converters utilizing other algorithms may be used.

The FFT 32 demodulates the carrier group, which is multiplexed along the frequency axis, by mapping the receiving signal in the second the first branch 5 from a signal along the time axis to a signal along the frequency axis. Here, the carrier group, which the FFT 32 demodulates, is a first carrier group. The first carrier group includes a plurality of carriers; and each of the plurality of carriers is orthogonally multiplexed each other.

The first carrier group includes a data carrier, a pilot carrier, and a transmission control carrier according to the OFDM signal defined by the ISDB-T standard.

The FFT 22 outputs the decoded first carrier group to the first waveform equalizer 23 and the first judging unit 25. Herein, the data carrier demodulated by the FFT 22 is called the first data carrier, and the pilot carrier demodulated by the FFT 22 is called the first pilot carrier.

The FFT 32 demodulates the carrier group, which is multiplexed along the frequency axis, by mapping the receiving signal in the second branch 6 from a signal along the time axis to a signal along the frequency axis. Here, the carrier group, which the FFT 32 demodulates, is a second carrier group. The second carrier group includes a plurality of carriers; and each of the plurality of carriers is orthogonally multiplexed each other.

Similar to the first carrier group, the second carrier group, according to the OFDM signal defined by the ISDB-T standard, includes a data carrier, a pilot carrier, and a transmission control carrier. Here, the data carrier demodulated by the FFT 32 is called the second data carrier, and the pilot carrier demodulated by the FFT 32 is called the second pilot carrier.

The FFT 32 outputs the demodulated second carrier group to the second waveform equalizer 33 and the second judging unit 35.

Since the FFTs 22 and 32 perform time-frequency conversion in response to outputs from the wave detecting units 21 and 31, the FFTs 22 and 32 preferably also have functions of adjusting an extracting range (window position).

The OFDM signal demodulated by these FFTs 22 and 32 is typically illustrated in FIG. 2.

In FIG. 2, the horizontal axis is a frequency axis, and a vertical axis is a time axis. Each of the circle signs written in FIG. 2 indicates each carrier included in a carrier group. Each of the carriers is multiplexed along the frequency axis. In the time axis, these multiplexed carriers are defined as one symbol. This symbol is multiplexed along the time axis. The decoding unit (not shown in FIG.) decodes a transmission control carrier. The control unit 10 judges a broadcast method and a modulating method. Similarly, the detecting unit 14 detects frame synchronization using the transmission control carrier. Here, a frame is a unit on the basis of a predetermined number of symbols.

As clear from FIG. 2, the carrier group includes: a data carrier in which image/audio data has been demodulated; a pilot carrier; and a transmission control carrier. Each of the data carrier, the pilot carrier, and the transmission control carrier is outputted to the first waveform equalizer 23, the second waveform equalizer 33, the first judging unit 25, and the second judging unit 35.

(Waveform Equalizer)

The first branch 5 and the second branch 6 are respectively provided with the first waveform equalizer 23 and the second waveform equalizer 33.

The first waveform equalizer 23 performs amplitude/phase control on the first data carrier based on the first pilot carrier, and calculates a first reliability value indicating the reliability of the first data carrier.

The first pilot carrier is a carrier whose amplitude and phase are known. The first waveform equalizer 23 divides respective components of the received first pilot carrier by respective components of the known pilot carrier. By this division, the amount of variation of amplitude and phase of the first pilot carrier is calculated. Based on this amount of variation, channel response is presumed.

The first waveform equalizer 23 corrects the amplitude and phase of the first data carrier demodulated by the FFT 22 based on this presumed channel response, thereby improving demodulation accuracy.

The first waveform equalizer 23 outputs the first data carrier whose amplitude and phase are corrected, and the calculated first reliability value to the combining/selecting unit 8.

The second waveform equalizer 33 included in the second branch 6 also has the same function as the first waveform equalizer 23, and performs the same process. The second waveform equalizer 33 corrects the amplitude and phase of the second data carrier based on the second pilot carrier, and calculates a second reliability value indicating the reliability of the second data carrier.

(Timing Adjusting Unit)

The timing adjusting unit 7 synchronizes the process timing of the demodulation by the FFT 22 and the process timing of the demodulation by the FFT 32. That is, start carriers demodulated by the FFT 22 and the FFT 32 are arranged.

As apparent from FIG. 2, since the OFDM signal has a symbol-based unit, the timing adjusting unit 7 synchronizes the process timing of symbols inputted into the FFT 22 included in the first branch 5 and into the FFT 32 included in the second branch 6.

With the timing adjustment, it is possible to synchronize the processing timing of carrier for the first carrier group and the processing timing of carrier for the second carrier group to be inputted in to the combining/selecting unit 8 that will be mentioned later Referring to FIG. 3 and FIG. 4, the timing adjusting unit 7 will be explained.

Figure 3:
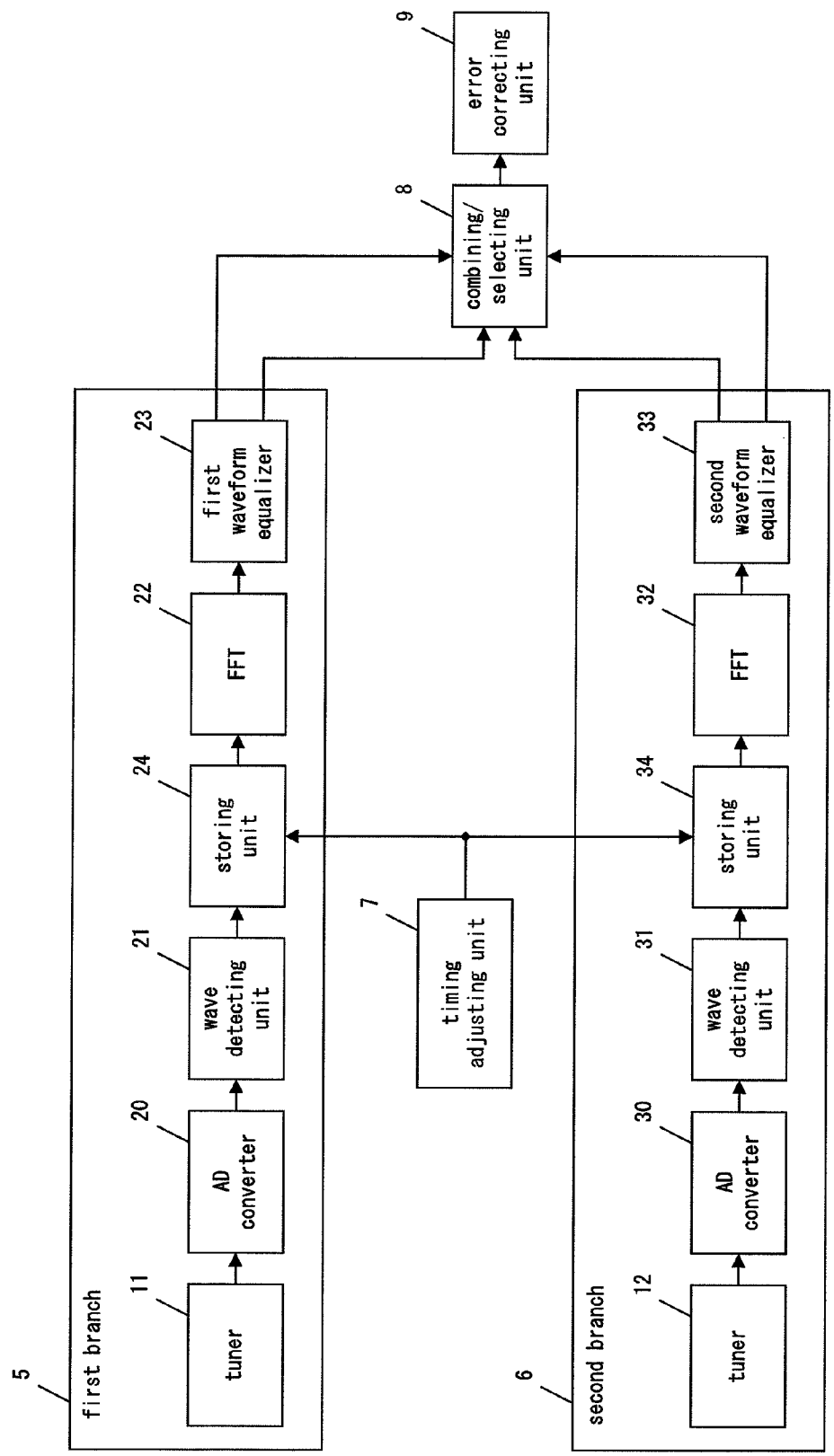
FIG. 3 is a block diagram of a timing adjusting unit and the neighboring thereto according to Embodiment 1 of the present invention.

FIG. 3 is a block diagram of a timing adjusting unit and the neighboring thereto according to Embodiment 1 of the present invention. FIG. 4 is a timing chart explaining timing adjustment according to Embodiment 1 of the present invention.

The first branch 5 is provided with a storing unit 24 for storing an output of the wave detecting unit 21. The second branch 6 is provided with a storing unit 34 for storing an output of the wave detecting unit 31. The storing unit 24 and the storing unit 34 store a received signal of one symbol, respectively. At the same predetermined timing, the timing adjusting unit 7 reads the stored received signal in a unit of one symbol from both the storing unit 24 and the storing unit 34, and outputs it to the FFT 22 and the FFT 32. As a result, when the FFT 22 and the FFT 32 start demodulation, the FFTs can perform demodulation from a head position of the same symbol, and the process timing of the start carrier in the demodulation is synchronized.

Figure 4:
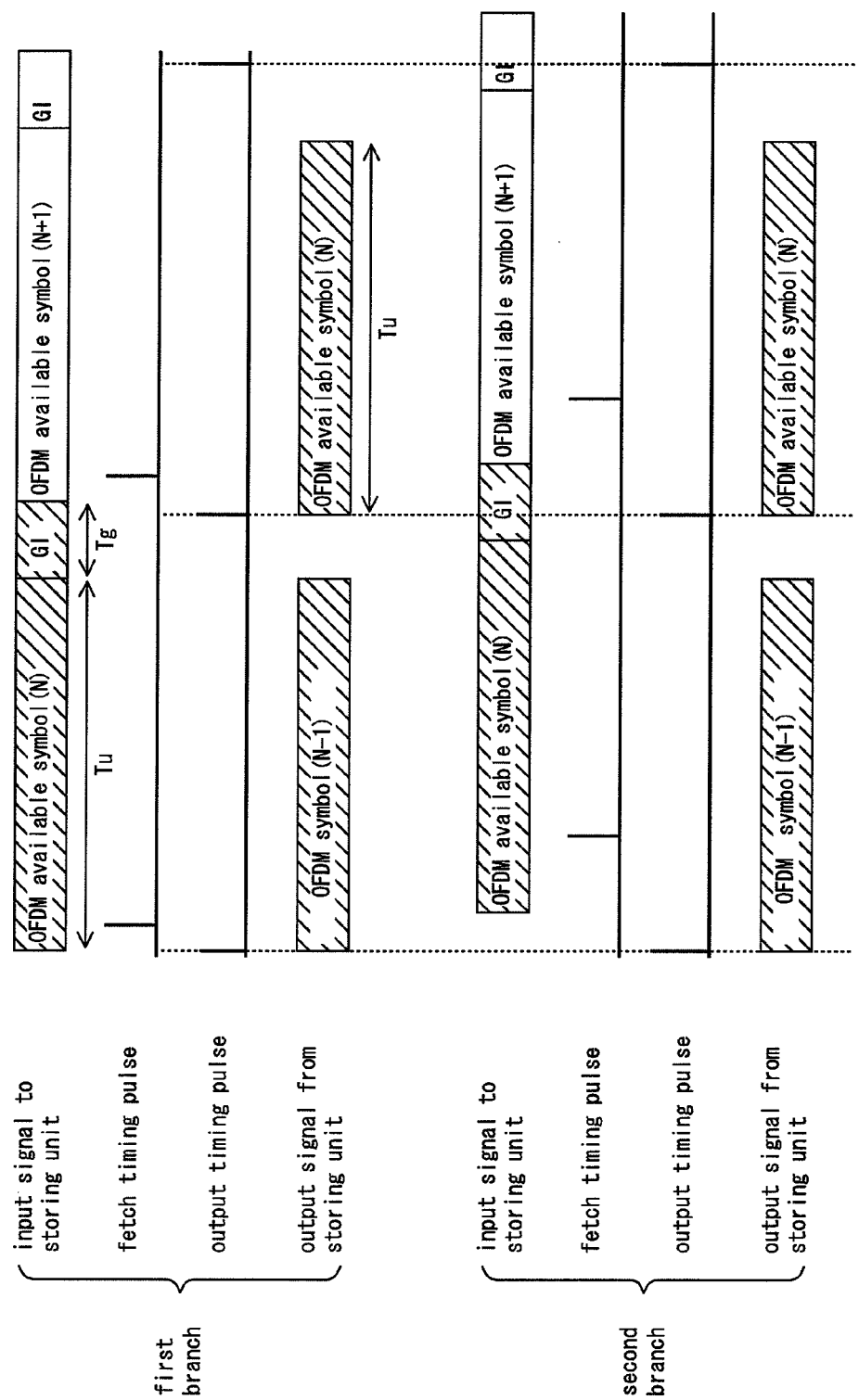
FIG. 4 is a timing chart explaining timing adjustment according to Embodiment 1 of the present invention.

A timing chart of the timing adjustment using the storing units 24 and 34 is shown in FIG. 4. Timing adjustment will now be explained referring to FIG. 4.

In FIG. 4, an upper half chart illustrates process by the first branch 5, and a lower half chart illustrates process by the second branch 6. Since the first branch 5 and the second branch 6 receive the OFDM signal independently and respectively, there is a difference of time between OFDM symbols inputted into the storing unit 24 and the storing unit 34. The storing unit 24 and the storing unit 34 stores the N (natural number)-th OFDM symbol individually and respectively. This means that each of the storing unit 24 and the storing unit 34 have stored the N-th OFDM symbol at a certain time.

Next, the timing adjusting unit 7 sends the same output timing pulse to both of the storing unit 24 and the storing unit 34. The storing unit 24 and the storing unit 34 output the N-th stored OFDM symbol to the FFT 22 and the FFT 32, respectively according to the output timing pulse in the same time. As a result, the FFT 22 and the FFT 32 can start the demodulating simultaneously from the head position of the same symbol. That is, start carriers in demodulation by the FFT 22 and the FFT 32 can be identically arranged. In other words, process timing in carrier demodulation by the first branch 5 and the second branch 6 are synchronized.

As a result, the combining/selecting unit 8 performs combining/selecting for every carrier after the process timing in data carrier by the first branch 5 and the second branch 6 has been synchronized.

In addition, the timing adjustment explained in FIG. 3 and FIG. 4 is an example, and another method may be used.

(Combining/Selecting Unit)

Using the first reliability value outputted by the waveform equalizer 34 and the second reliability value outputted by the waveform equalizer 33, carriers included in each of the first data carrier group and the second data carrier group are selected or combined. At this time, the combining/selecting unit 8 determines whether it should select or combine them according to an instruction that is set. The setting is performed by a program executed on a CPU or a register setting.

First, a case of selecting will now be explained.

The first data carrier group is inputted into the combining/selecting unit 8 from the first branch 5, and the second data carrier group is inputted into the combining/selecting unit 8 from the second branch 6. Similarly, the first reliability value with respect to each data carrier included in the first data carrier group and the second reliability value with respect to each data carrier included in the second data carrier group are inputted into the combining/selecting unit 8. The combining/selecting unit 8 compares the first reliability value with respect to an arbitrary data carrier included in the first data carrier group with the second reliability value with respect to the corresponding data carrier (having the same carrier position in the frequency axis) included in the second data carrier group, and selects and outputs a data carrier having the larger value (when the larger value indicates the higher reliability).

This selection enables to use a data carrier of branch in a better receiving status for decoding by the final image/audio decoding unit 40, thereby improving quality of reception.

Next, a case of combining will now be explained.

The combining/selecting unit 8 performs the maximum ratio combining to the data carrier included in the first data carrier group and the data carrier included in the second carrier group that corresponds thereto, based on the reliability value. The maximum ratio combining means calculating the average value according to the reliability value, and combining the data carrier of the first data carrier group and the second data carrier group.

Figures 5, 6:
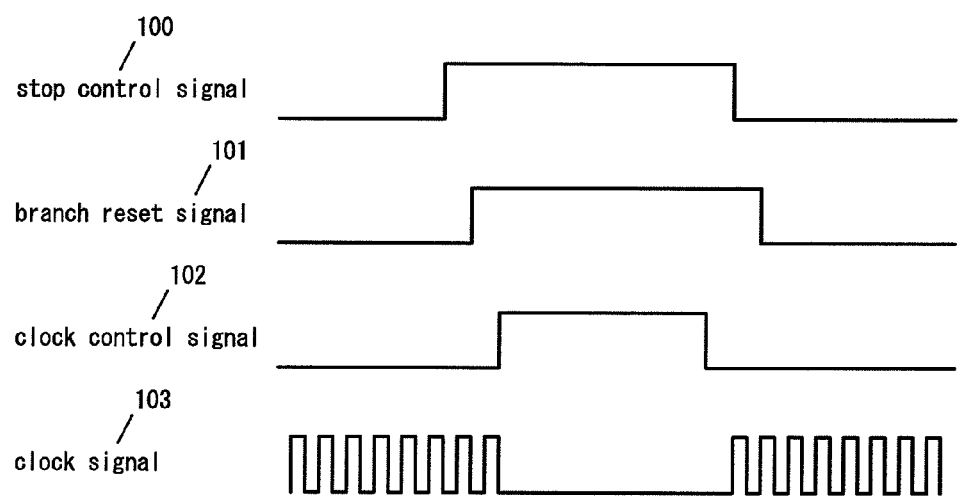
FIG. 5 indicates explanation of maximum ratio combining according to Embodiment 1 of the present invention.
FIG. 6 is a block diagram of a diversity receiving apparatus according to Embodiment 2 of the present invention.

It will now be explained referring to FIG. 5. FIG. 5 indicates explanation of maximum ratio combining according to Embodiment 1 of thee present invention.

In FIG. 5, the reliability value has three steps of values from a value of "1" to a value of "3". A larger reliability value means higher reliability. In other words, the reliability value of "3" has higher reliability than the reliability value of "1". Moreover, the data carrier included in the first carrier group is "C1", and the data carrier included in the second carrier group is "C2".

The top row shows the reliability value of the data carrier "C1" that is the first reliability value. The leftmost column shows the reliability value of the data carrier "C2" that is the second reliability value.

As shown in FIG. 5, the combining/selecting unit 8 calculates the maximum ratio combining based on the reliability value, and outputs the result. For example, when the first reliability value of a data carrier "C1" is a value of "2" and the second reliability value of a data carrier "C2" is a value of "1", the combining/selecting unit 8 performs the calculation according to the equation of $((2*C1)+C2)/3$, and outputs it. When the reliability values differ, it is as indicated in FIG. 5.

Moreover, in addition to the maximum ratio combining, the combining/selecting unit 8 may perform equal ratio combining, which is combining the data carriers included in the first carrier group and the second carrier group at a fixed ratio.

In addition, the combining/selecting unit 8 performs selecting and combining for every carrier.

The selection and combination for every carrier by the combining/selecting unit 8 enables to improve demodulation accuracy, and to reduce a bit error rate, or the like, thereby improving receiving performance.

The combining/selecting unit 8 outputs the combined or selected result to the error correcting unit 9.

(Error Correcting Unit)

The error correcting unit 9 corrects an error of the digital data included in a demodulated carrier or a carrier.

The error correcting unit 9 performs Viterbi decoding, Reed-Solomon decoding etc., and detects and corrects the error of carrier or data. The digital data, to which the error correction is performed, is outputted as packet data regarding an image and/or an audio.

(Judging Unit)

The first branch 5 is provided with a first judging unit 25, and the second branch 6 is provided with a second judging unit 35. The details of the first judging unit 25 and the second judging unit 35 will be explained after Embodiment 2.

The first judging unit 25 judges a receiving status of the first branch 5, and outputs a judgment result to the control unit 10.

Similarly, the second judging unit 35 judges a receiving status of the second branch 6, and outputs a judgment result to the control unit 10.

Herein, based on the receiving status of the first branch 5, the first judging unit 25 judges the first branch 5 as either a "stopping branch" or an "operating branch", and outputs this judgment result to the control unit 10.

Similarly, based on the receiving status of the second branch 6, the second judging unit 35 judges the second branch 6 as either a "stopping branch" or an "operating branch", and outputs this judgment result to the control unit 10.

The first judging unit 25 judges the receiving status of the first branch 5 using the output from the FFT 22. The second judging unit 35 judges the receiving status of the second branch 6 using the output from the FFT 32.

(Control Unit)

The control unit 10 performs control necessary for all of the diversity receiving apparatus. For example, the control unit 10 judges a broadcasting method and a modulation method of the received OFDM signal, and controls methods for reception and demodulation by the first branch 5 and the second branch 6 according to the judged result.

In addition, the control unit 10 controls stopping and starting of at least one of the first branch 5 and the second branch 6 based on at least one of the receiving status of the first branch 5 and the receiving status of the second branch 6.

At this time, the control unit 10 controls stopping and starting of the first branch 5 and the second branch 6 based on the judgment result outputted from the first judging unit 25 and the judgment result outputted from the second judging unit 35. When receiving a judgment result indicating a "stopping branch", the control unit performs at least one of initializing a value stored corresponding to the branch and reducing (including stopping) clock signals used by the corresponding branch.

(Image/Audio Decoding Unit)

An image/audio decoding unit 40 decodes packet data outputted by the error correcting unit 9 according to a predetermined method. The decoded packet data is reproduced as an image and an audio. Thus, a user can view and listen to them in a mobile terminal provided with the diversity receiving apparatus 1.

(Operation of Diversity Receiving Apparatus)

Next, operation of the diversity receiving apparatus 1 according to Embodiment 1 of the present invention will now be explained.

The first branch 5, each element of which operates as explained in details, demodulates to the OFDM signal received by the antenna 2 and the tuner 11, and outputs the first carrier group.

The first carrier group includes the first data carrier and the first pilot carrier. Similarly, the second branch 6 demodulates to the OFDM signal received by the antenna 3 and the tuner 12, and outputs the second carrier group. The second carrier group includes the second data carrier and the second pilot carrier.

The first judging unit 25 judges the receiving status of the first branch 5, and outputs a judgment result of either a "stopping branch" or an "operating branch" to the control unit 10. Similarly, the second judging unit 35 judges the receiving status of the second branch 6, and outputs a judgment result of either a "stopping branch" or an "operating branch" to the control unit 10.

The control unit 10 controls stopping and starting the first branch 5 and the second branch 6 in response to the judgment results of the first judging unit 25 and the second judging unit 35. This control will be explained using some cases below.

(Case where all Branches are Operating Branches)

When the first judging unit 25 and the second judging unit 35 judge that the first branch 5 and the second branch 6 as "operating branches", respectively, each of the first branch 5 and the second branch 6 receives and demodulates a signal.

The antenna 2 receives an OFDM signal. The tuner 11 receives a predetermined bandwidth OFDM signal from the OFDM signal received by the antenna 2, and outputs the predetermined bandwidth OFDM signal to the analog-to-digital converter 20. The analog-to-digital converter 20 converts the received signal of an analog signal into a digital signal according to predetermined resolution.

According to orthogonal detection, or the like, the wave detecting unit 21 detects an output of the analog-to-digital converter 20, and outputs it to the FFT 22. The FFT 22 converts the detected received signal from a signal along a time axis to a signal along a frequency axis, and outputs it to the first judging unit 25 and the first waveform equalizer 23.

According to amplitude of the first pilot carrier or the first data carrier included in the output of the FFT 22 or variation of the amplitude, the first judging unit 25 judges the first branch 5 as an "operating branch" or a "stopping branch", and outputs a judgment result to the control unit 10. Herein, the first judging unit 25 has judged the first branch 5 as an "operating branch."

The first waveform equalizer 23 corrects the amplitude and phase of the first data carrier outputted by the FFT 22, and calculates and outputs a first reliability value indicating the reliability of the first data carrier. The reliability is an index indicating that each receiving status of the data carrier of the first data carrier group is good or bad. According to a parameter of channel response calculated by dividing amplitude and phase of the decoded and received first pilot carrier by ideal amplitude and phase of the known pilot carrier, the first waveform equalizer 23 corrects the amplitude and phase of the first data carrier.

The second branch 6 performs the same demodulation process as the first branch 5. Herein, the second branch 6 is also judged as an "operating branch."

As explained referring to FIG. 3 and FIG. 4, the timing adjusting unit 7 synchronizes the process timing of demodulation by the FFT 22 and demodulation by the FFT 32.

Herein, since both the first branch 5 and the second branch 6 are "operating branches", the first branch 5 outputs the first reliability value and the first data carrier to the combining/selecting unit 8, and the second branch 6 outputs the second reliability value and the second data carrier to the combining/selecting unit 8.

Since the first branch 5 and the second branch 6 are "operating branches", respectively, the combining/selecting unit 8 performs combining/selecting of the first data carrier and the second data carrier according to the first reliability value and the second reliability value, which have been outputted therefrom.

As illustrated in FIG. 5, for example, according to the first reliability value and the second reliability value, the first data carrier and the second data carrier are maximum-ratio-combined.

Alternatively, the data carrier having the greater value among the first reliability value and the second reliability value is selected.

Thus, the combining/selecting for every carrier enables to improve quality of reception.

(Case where the First Branch 5 is a Stopping Branch and the Second Branch 6 is an Operating Branch)

Herein, the case where the first branch 5 is judged as a "stopping branch" will now be explained.

In a predetermined status based on amplitude of the first pilot carrier outputted from the FFT 22, or variation of the amplitude, the first judging unit 25 judges the first branch 5 as a "stopping branch."

This judgment result is outputted to the control unit 10.

In response to the judgment result of a "stopping branch", the control unit 10 performs stopping process of the first branch 5. The stopping process includes at least one of initializing a value stored by the first branch 5 and reducing (including stopping) clock signals used by the first branch 5.

More concretely, the control unit 10 performs process illustrated in FIG. 6 on the first branch 5.

FIG. 6 is a timing chart explaining stopping process in Embodiment 1 according to the present invention.

In FIG. 6, a stop control signal 100, a branch reset signal 101, a clock control signal 102, and a clock signal 103 are illustrated up and down in this order.

The control unit 10 receives this stop control signal 100 from the first branch 5. In response to this stop control signal, the control unit 10 generates and outputs the branch reset signal 101 and the clock control signal 102. First, the control unit 10 generates the branch reset signal 101 for initializing a value stored by the first branch 5 based on the stop control signal 100. The value stored by the first branch 5 is initialized by this branch reset signal 101. For example, the value stored by a storing element, such as a memory and a flip-flop, or the like, included in the first branch 5 is initialized into a value of "0", a value of "1", or the like. The value to be initialized depends on design specification of the diversity receiving apparatus 1.

Next to the branch reset signal 101 used for initialization of the stored value, the clock control signal 102 is generated. The clock control signal 102 controls reducing (including stopping) clock signals used by the first branch 5. The clock signals used by the first branch 5 are clock signals inputted into a sequence circuit element that needs internal clock signals of the first branch 5, and these clock signals may be supplied from the exterior of the first branch 5 to the first branch 5, or may be generated in the interior of the first branch 5 itself.

The clock signals used by the first branch 5 widely includes frequency-divided and/or multiplicated clock signals.

The clock control signal 102 becomes active, and then the clock signals of the first branch 5 are reduced or stopped.

In FIG. 6, during a period when the clock control signal 102 is active (High level, in FIG. 6), the clock signal 103 is stopped.

Before the timing of stopping the clock signals, the value stored by the first branch 5 has been initialized. Therefore, the value stored by the storage element is not inadequately overwritten because of stopping the clock signals. For this reason, a signal of an inadequate value is not outputted from the first branch 5 of a stopping branch, and no malfunction occurs in the combining/selecting unit 8. Especially, the signal of an inappropriate value is not outputted even when the first branch 5 changes from a stopping branch to an operating branch, and no malfunction occurs in the combining/selecting unit 8.

The power consumption of the diversity receiving apparatus 1 is reduced by reducing or stopping the clock signals of the first branch 5 of a stopping branch. Herein, quality of reception and reliability of the first data carrier demodulated by the first branch 5 judged as a "stopping branch" is low. If the first data carrier is used for combining for every carrier in the combining/selecting unit 8, quality of reception may be deteriorated by contraries. Usability is improved by not continuing operation of the first branch 5 in such a status, but stopping the clock signals to stop the operation, thereby reducing power consumption.

The control unit 10 may instruct the combining/selecting unit 8 not to perform combining for every carrier with respect to the first data carrier and the second data carrier, thereby removing the first data carrier from an object of the combining. Alternatively, in initialization of the first branch 5, the control unit 10 may fix all of first reliability values outputted from the first branch 5 into a value of "0", thereby reducing or removing contribution degree of the first data carrier to the combining by the combining/selecting unit 8. Alternatively, it is possible for the control unit 10 to instruct the combining/selecting unit 8 to surely select the second data carrier.

In any way, the first branch 5 becomes a branch that is not used in the diversity receiving, and normal receiving with the second branch 6 is performed in Embodiment 1.

In addition, when there are three or more branches, diversity receiving for every carrier with a branch judged as an operating branch is performed. The number of branches with which the diversity receiving apparatus 1 is provided is not limit especially on this specification.

While reducing or removing contribution degree of the first data carrier outputted from the first branch 5 to the diversity for every carrier, the control unit 10 performs reducing or stopping clock signals so as to reduce power consumption. Simultaneously, the control unit 10 initializes the stored value of the first branch 5 in order to prevent malfunction of the diversity receiving apparatus 1.

(Case where the First Branch 5 is an Operating Branch and the Second Branch 6 is a Stopping Branch)

When the first branch 5 is judged as an operating branch and the second branch 6 is judged as a stopping branch, the control unit 10 performs initializing the stored value of the second branch 6, and stopping/reducing clock signals.

In this case, the combining/selecting unit 8 performs process after reducing or removing contribution degree of the second data carrier demodulated by the second branch 6.

When the first branch 5 and the second branch 6 are changed from stopping branches to operating branches, the control unit 10 cancels the clock control signal 102 to restores the clock signal, and after that cancels the branch reset signal 101 to release the initialization status. Malfunction can be prevented by performing process in such a procedure.

As mentioned above, the diversity receiving apparatus 1 in Embodiment 1 removes a branch in a deteriorated status from an object of the combining, thereby enabling to prevent deterioration of quality of reception. Malfunction caused by occurrence of a stopping branch can be prevented by initializing a stored value of the stopping branch. Unnecessary power consumption can be reduced by stopping/reducing clock signals of the stopping branch.

(Embodiment 2)

Next, Embodiment 2 will now be explained referring to FIG. 7.

Figure 7:
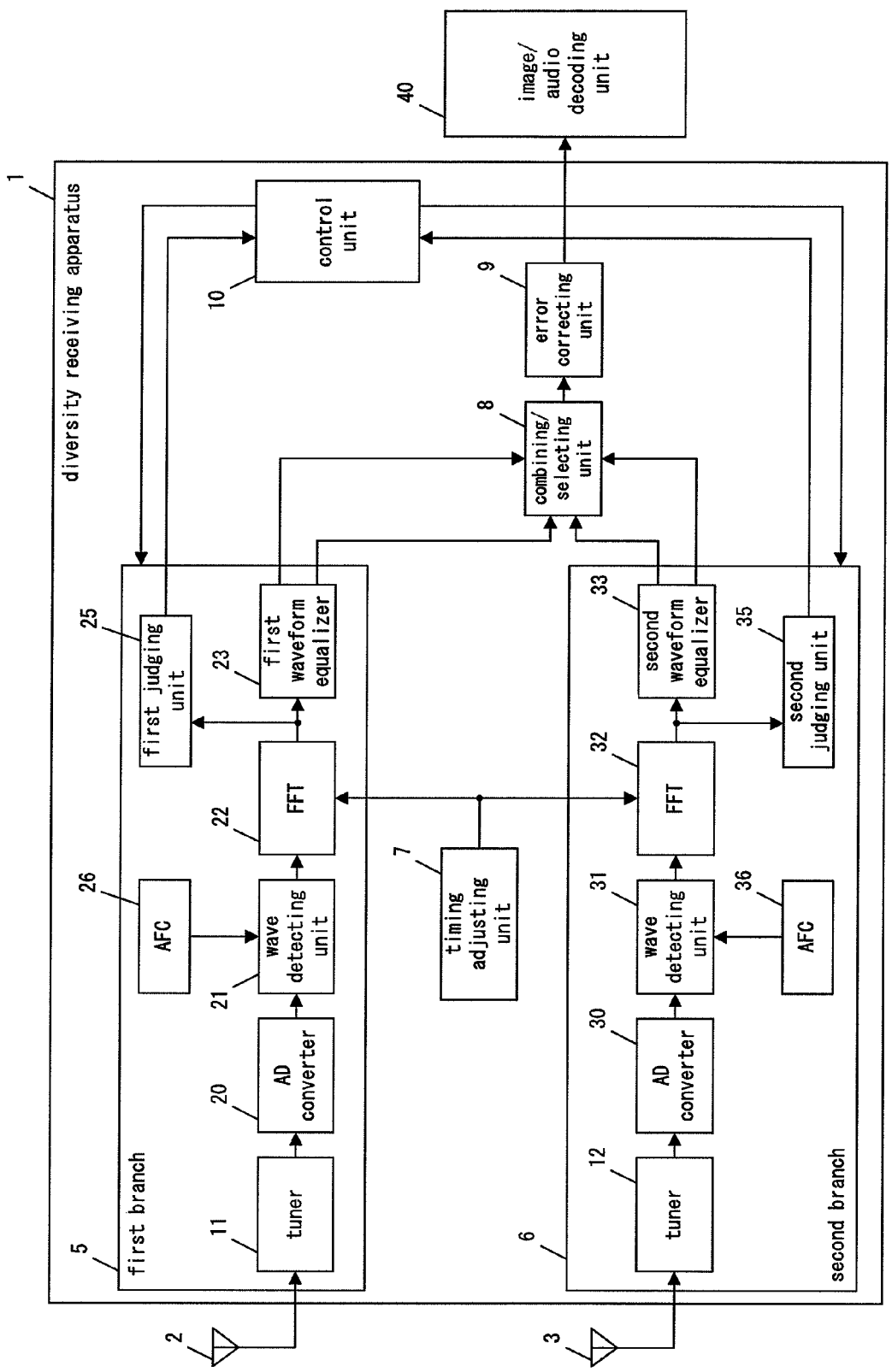
FIG. 7 is a block diagram of a diversity receiving apparatus according to Embodiment 2 of the present invention.

FIG. 7 is a block diagram of a diversity receiving apparatus in Embodiment 2 according to the present invention.

Dissimilar to FIG. 1, each of the first branch 5 and the second branch 6 is provided with a correcting unit (illustrated with the word of "AFC" in Figs.) for correcting an amount of frequency-offset.

The amount of frequency-offset is an amount of offset used in order to prevent deterioration of wave-detection accuracy caused by the difference between center frequency used by the tuners 11 and 12, and frequency used for detection by the wave detecting units 21 and 31.

The correcting units 26 and 36 calculate this amount of frequency-offset. Furthermore, the correcting units 26 and 36 correct the frequency used for detection by the wave detecting units 21 and 31 using the calculated amount of frequency-offset.

Herein, as long as receiving the same bandwidth OFDM signal, the amount of frequency-offset hardly changes. This is because the amount depends on setting frequency of a local oscillator giving the center frequency to the tuners 11 and 12. When receiving bandwidth is not changed, the difference between the center frequency used by the tuners 11 and 12 and frequency used for detection by the wave detecting units 21 and 31 hardly changes.

For this reason, when initializing a stored value of a stopping branch (either the first branch 5 or the second branch 6), the control unit 10 dose not initialize the amounts of frequency-offset stored by the correcting units 26 and 36, but retains them as they are.

Thus, the amount of frequency-offset is not initialized but retained, it is unnecessary to re-calculate the amount of frequency-offset of a branch that has changed from a stopping branch to an operating branch when decoding by the branch is resumed. As a result, time from resuming the wave detecting units 21 and 31 to starting operation thereof can be shortened.

As mentioned above, the diversity receiving apparatus 1 in Embodiment 2 can shorten starting time of demodulating operation after resuming a branch in a deteriorated receiving status.

(Embodiment 3)

Next, Embodiment 3 will now be explained.

In Embodiment 3, the judging process in each of the first judging unit 25 and the second judging unit 35 is explained. The first judging unit 25 judges a receiving status of the first branch 5, and judges the first branch 5 as either a "stopping branch" or an "operating branch." Similarly, the second judging unit 35 judges a receiving status of the second branch 6, and judges the second branch 6 as either a "stopping branch" or an "operating branch."

FIRST EXAMPLE OF JUDGING RECEIVING STATUS

The first judging unit 25 judges a receiving status based on at least one of an amplitude value of a first pilot carrier outputted from the FFT 22 and a variation value thereof. Similarly, the second judging unit 35 judges a receiving status based at least one of an amplitude value of a second pilot carrier outputted from the FFT 32 and a variation value thereof.

Figure 8:
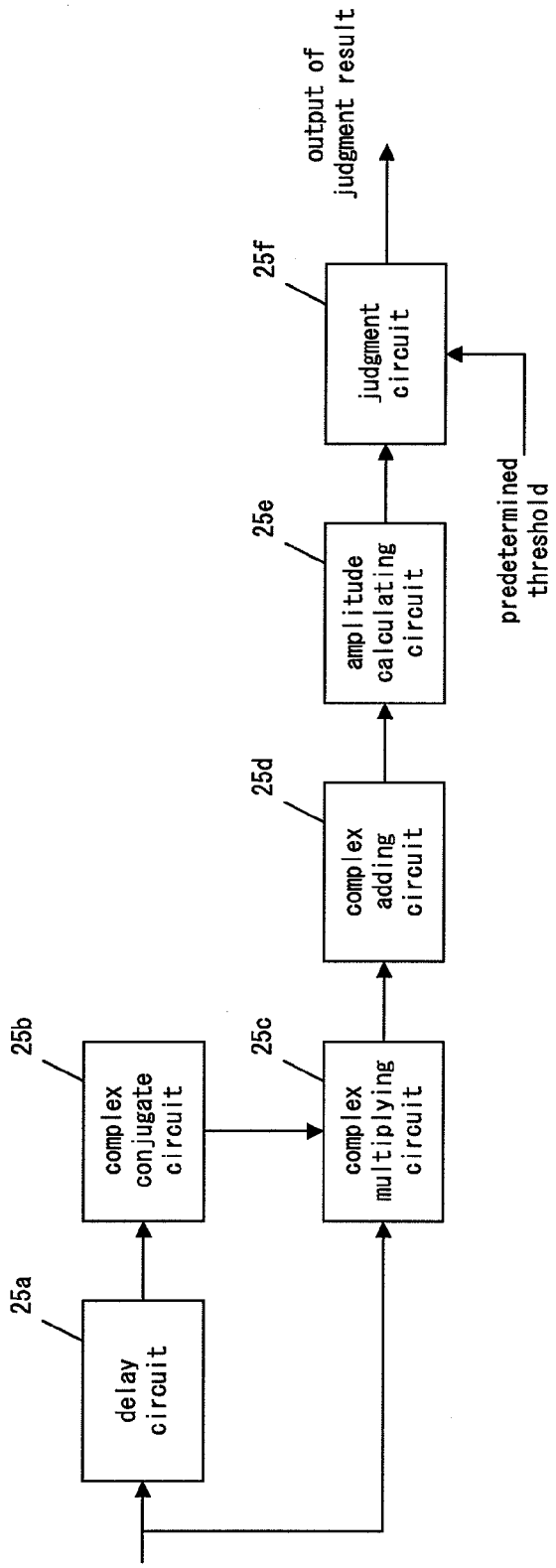
FIG. 8 is a block diagram of a diversity receiving apparatus according to Embodiment 2 of the present invention.

Referring to FIG. 8, an example of judging the receiving statuses by the first judging unit 25 and the second judging unit 35 will now be explained.

FIG. 8 shows an internal block of the first judging unit in Embodiment 3 according to the present invention. The internal block of the second judging unit 35 and operation of the second judging unit 35 is the same.

An output signal of the FFT 22 is inputted into a delay circuit 25a and a complex multiplying circuit 25c. The delay circuit 25a outputs a first carrier group delayed by four symbols outputted from the FFT 22. A complex conjugate circuit 25b calculates a complex conjugate of the first carrier group outputted by the delay circuit 25a. The complex multiplying circuit 25c multiplies respective components of the first carrier group without delay for four symbols outputted by the FFT 22 and respective components of an output of the complex conjugate circuit 25b.

Herein, the pilot carrier has fixed phase and amplitude. For this reason, an output vector of the complex multiplying circuit 25c has a fixed direction. The complex adding circuit 25d extracts complex multiplied pilot carrier, and performs analog-like additional calculation on all symbols of the OFDM signal.

An amplitude calculating circuit 25e calculates the size of a vector of the pilot carrier using the output of the complex adding circuit 25d. The size of this vector indicates an amplitude value of the first pilot carrier included in the first carrier group.

A judgment circuit 25f compares this amplitude value with a predetermined threshold. The judgment circuit 25f judges the first branch 5 as an "operating branch" when the amplitude value is greater than a predetermined threshold. The judgment circuit 25f judges the first branch 5 as a "stopping branch" when the amplitude value is not greater than the predetermined threshold. By the similar process, the second judging unit 35 also judges the second branch 6 as either an "operating branch" or a "stopping branch."

SECOND EXAMPLE OF JUDGING RECEIVING STATUS

Figure 9:
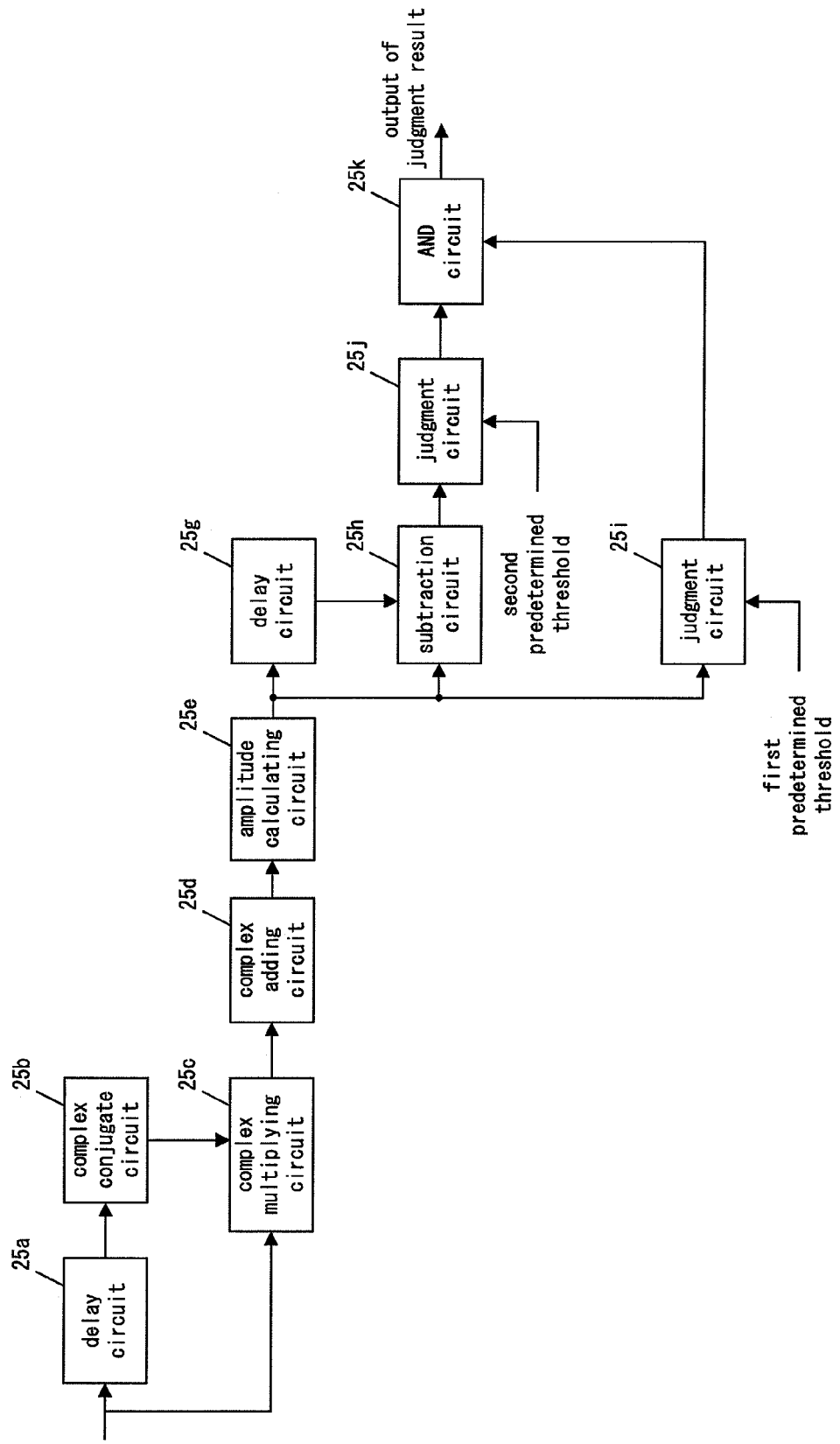
FIG. 9 indicates explanation of maximum ratio combining for a transmission control carrier according to Embodiment 2 of the present invention.

Next, other methods for judging receiving status are explained referring to FIG. 9. A judging unit shown in FIG. 9 calculates a variation value indicating a variation status of the amplitude value.

FIG. 9 illustrates an internal block of the first judging unit in Embodiment 3 according to the present invention. An internal block of the second judging unit 35 is also the same. The elements being attached with the same symbol as FIG. 8 have the same functions as explained referring to FIG. 8. That is, process by elements from the delay circuit 25a to the amplitude calculating circuit 25e is performed on the output from the FFT 22, thereby calculating the amplitude value of the first pilot carrier.

A delay circuit 25g delays an output of the amplitude calculating circuit 25e per symbol. A subtraction circuit 25h calculates the difference between the output of the amplitude calculating circuit 25e and an output of the delay circuit 25h. That is, the difference between the amplitude value of the first pilot carrier of the previous symbol and the amplitude value of the current first pilot carrier is obtained.

Herein, the amplitude value of the first pilot carrier outputted from the delay circuit 25g is an amplitude value of the first pilot carrier at first timing, which is certain time timing. The amplitude value of the first pilot carrier inputted to the subtraction circuit 25 and the judgment circuit 25i without passing through the delay circuit 25g is an amplitude value of the first pilot carrier at the second timing, which is later than the first timing. That is, the subtraction circuit 25h inputs both the amplitude value of the first pilot carrier at the first timing and the amplitude value of the first pilot carrier at the second timing that is later than the first timing are inputted. The subtraction circuit 25h can calculate the difference between the amplitude values of the first pilot carrier at these two items of timing.

A judgment circuit 25i compares the amplitude value of the first pilot carrier at the second timing with the first threshold to judge a receiving status at the second timing. On the other hand, the judgment circuit 25j compares the difference values of the amplitude at the first and second timing to judge variation of a receiving status in time. That is, according to the judging unit shown in FIG. 9, not only the receiving status at certain timing but variation of the receiving status proceeding with time can be judged.

The judgment circuit 25i compares the amplitude value of the first pilot carrier included in the current symbol with a first predetermined threshold. That is, the judgment circuit 25i judges a receiving status based on the amplitude value of the first pilot carrier included in the current symbol.

Furthermore, the judgment circuit 25j compares the output of the subtraction circuit, which is the difference value between the amplitude value of the first pilot carrier included in the current symbol and the amplitude value of the first pilot carrier included in the previous symbol, with a second threshold. Comparing the difference value with the second threshold enables to judge variation of the receiving status.

That is, the judgment circuit 25i comprehends the current receiving status, and the judgment circuit 25j comprehends variation of the receiving status.

An AND circuit 25k judges the first branch 5 as an "operating branch" when results of both the judgment circuit 25i and the judgment circuit 25j are proper.

Figure 10:
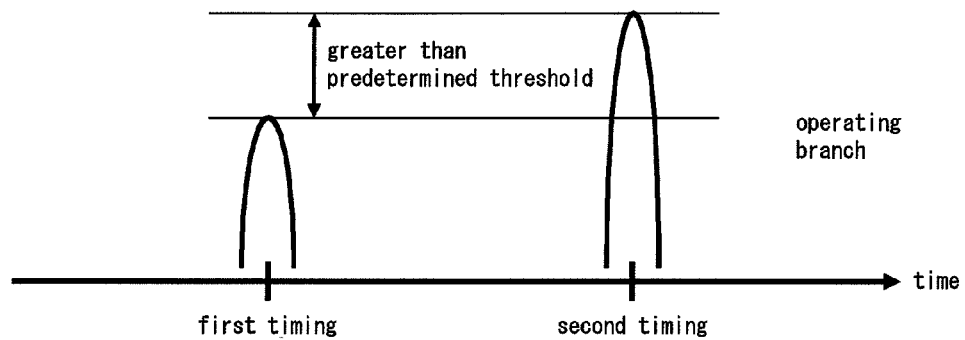
FIG. 10 is a diagram explaining judging process of a judging unit in Embodiment 3 according to the present invention.
Figure 10:
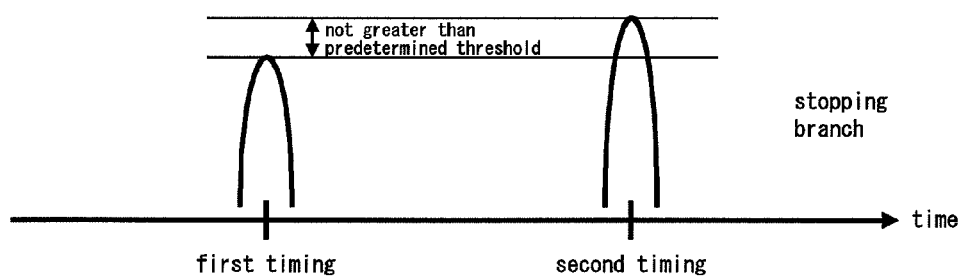
Figure 11:
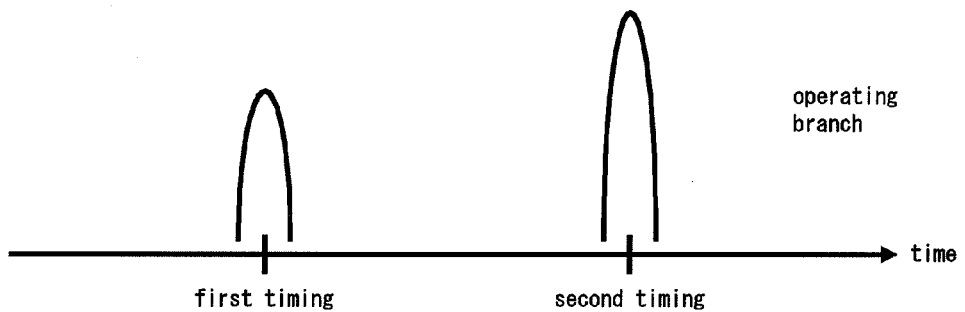
FIG. 11 is a diagram explaining judging process of the judging unit in Embodiment 3 according to the present invention.
Figure 11:
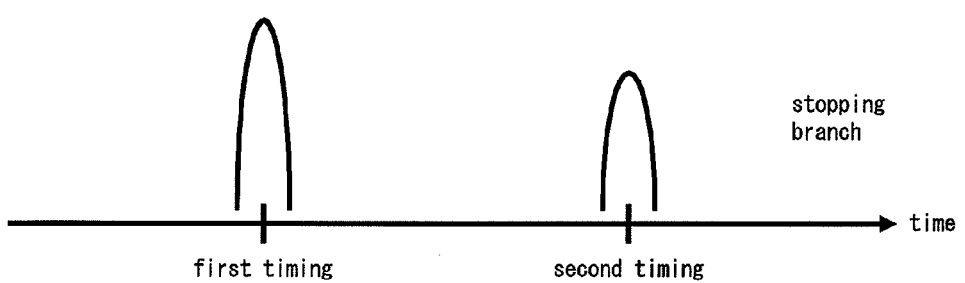

When performing judgment based on variation of receiving status in a fixed time, a method shown in FIG. 10 and FIG. 11 may be used.

Referring to FIG. 10 and FIG. 11, the judgment of an "operating branch" and a "stopping branch" considering variation of receiving status in time will now be explained. FIG. 10 and FIG. 11 are diagrams explaining judging process of the judging unit in Embodiment 3 according to the present invention.

FIG. 10 shows process of judging either an operating branch or a stopping branch, by comparing the difference between the amplitude value of the first pilot carrier at the first timing and the amplitude value of the first pilot carrier at the second timing with a predetermined threshold.

In FIG. 10, the first judging unit 25 judges the first branch 5 as an "operating branch" when the amplitude value of the first pilot carrier at the second timing is greater than the sum of the amplitude value of the first pilot carrier at the first timing and a predetermined threshold. On the other hand, the first judging unit 25 judges the first branch 5 as a "stopping branch" when the amplitude value of the first pilot carrier at the second timing is not greater than the sum of the amplitude value of the first pilot carrier at the first timing and a predetermined threshold.

In FIG. 11, the first judging unit 25 judges the first branch 5 as an "operating branch" when the amplitude value of the first pilot carrier at the second timing is greater than the amplitude value of the first pilot carrier at the first timing. On the other hand, the first judging unit 25 judges the first branch 5 as a "stopping branch" when the amplitude value of the first pilot carrier at the second timing is not greater than the amplitude value of the first pilot carrier at the first timing.

The judging unit shown in FIG. 9 enables, even if the receiving status rapidly changes caused by phasing, or the like, to judge the receiving status of branch while considering the variation.

For example, when the current receiving status had been good in general and the receiving status is suddenly deteriorated caused by phasing, the receiving status can be judged to be inappropriate, thereby enabling to judge the receiving status more precisely.

THIRD EXAMPLE OF JUDGING RECEIVING STATUS

Next, referring to FIG. 12, another method for judging the receiving status will now be explained. The judging unit shown in FIG. 12 judges the receiving status of each branch based on the difference of the receiving status for every branch.

Figure 12:
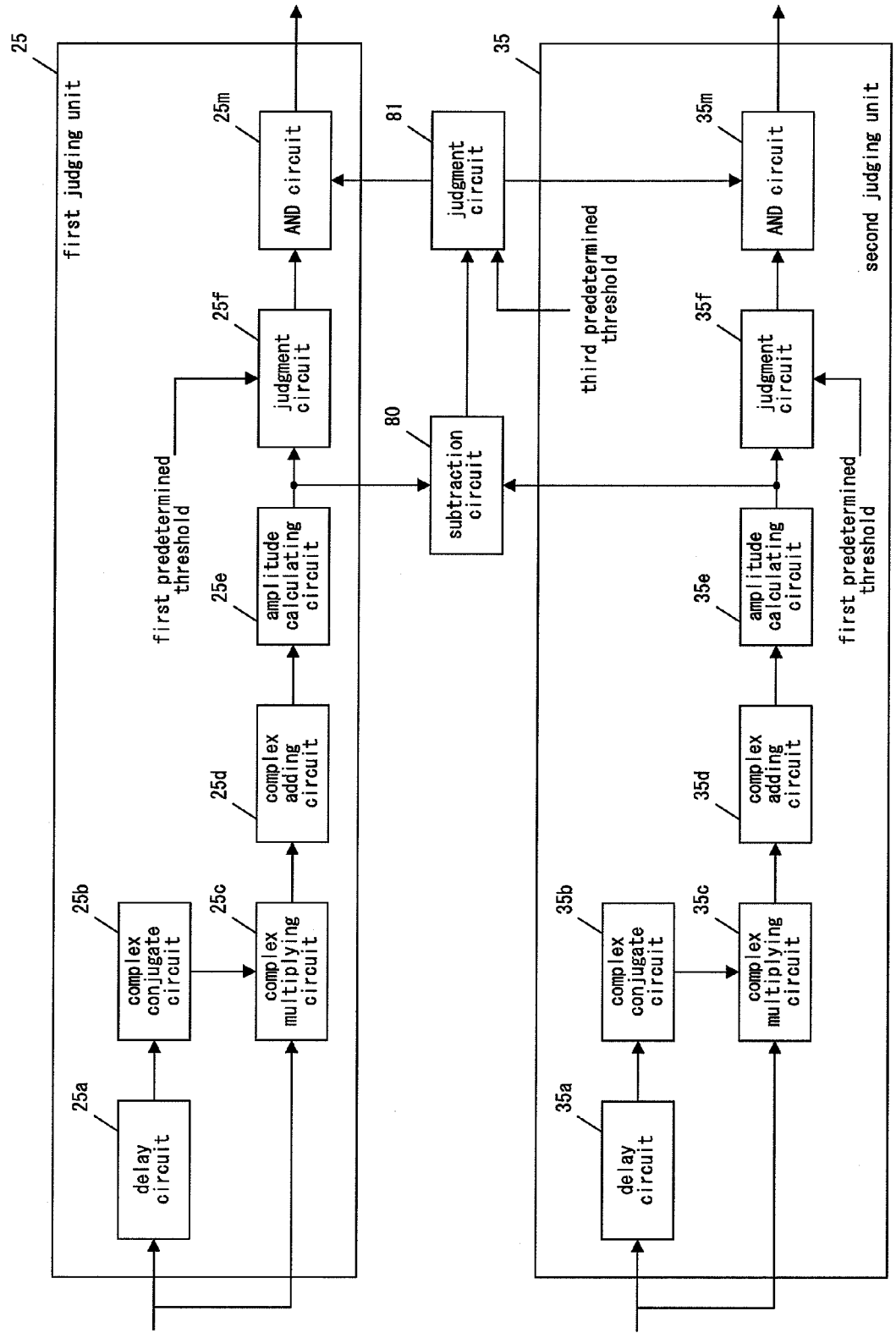
FIG. 12 is a block diagram of a first judging unit and a second judging unit in Embodiment 3 according to the present invention.

FIG. 12 is a block diagram of the first judging unit and the second judging unit in Embodiment 3 according to the present invention.

In FIG. 12, in addition to the first judging unit 25 and the second judging unit 35, a subtraction circuit 80 for comprehending the difference between the first branch 5 and the second branch 6, and a judgment circuit 81 for performing judgment based on the difference are provided.

The subtraction circuit 80 calculates the difference between the output of the amplitude calculating circuit 25e and the output of amplitude calculating circuit 35e. This difference indicates the difference of receiving levels of pilot carriers received by the first branch 5 and the second branch 6. The judgment circuit 81 compares a subtraction result of the subtraction circuit 80 with the third predetermined threshold, and outputs a judgment result to AND circuits 25m and 35m. Since the judgment circuit compares the difference, which is calculated by the subtraction circuit 80, of the receiving levels between two branches with a third predetermined threshold, it is judged whether the difference of the receiving levels of the two branches is large or small. Furthermore, it is judged which branch is in the less receiving status.

For example, when the receiving level of the first branch 5 is greater than the receiving level of the second branch 6, and further when the difference there-between is greater than the third threshold, the judgment circuit 81 outputs an appropriate judgment result to the AND circuit 25m, and an inappropriate judgment result to the AND circuit 35m, respectively. Consequently, the second branch 6 is judged as a "stopping branch" even when the amplitude of the pilot carrier in the second branch 6 is greater than a fixed value and further when the difference of the receiving levels in the first branch 5 is too large.

FOURTH EXAMPLE OF JUDGING RECEIVING STATUS

Next, referring to FIG. 13, another method for judging the receiving status will now be explained. The judging unit shown in FIG. 13 compares the amplitude of a data carrier with the amplitude of a pilot carrier being included in a decoded carrier group, and judges the receiving status of a corresponding branch.

Figure 13:
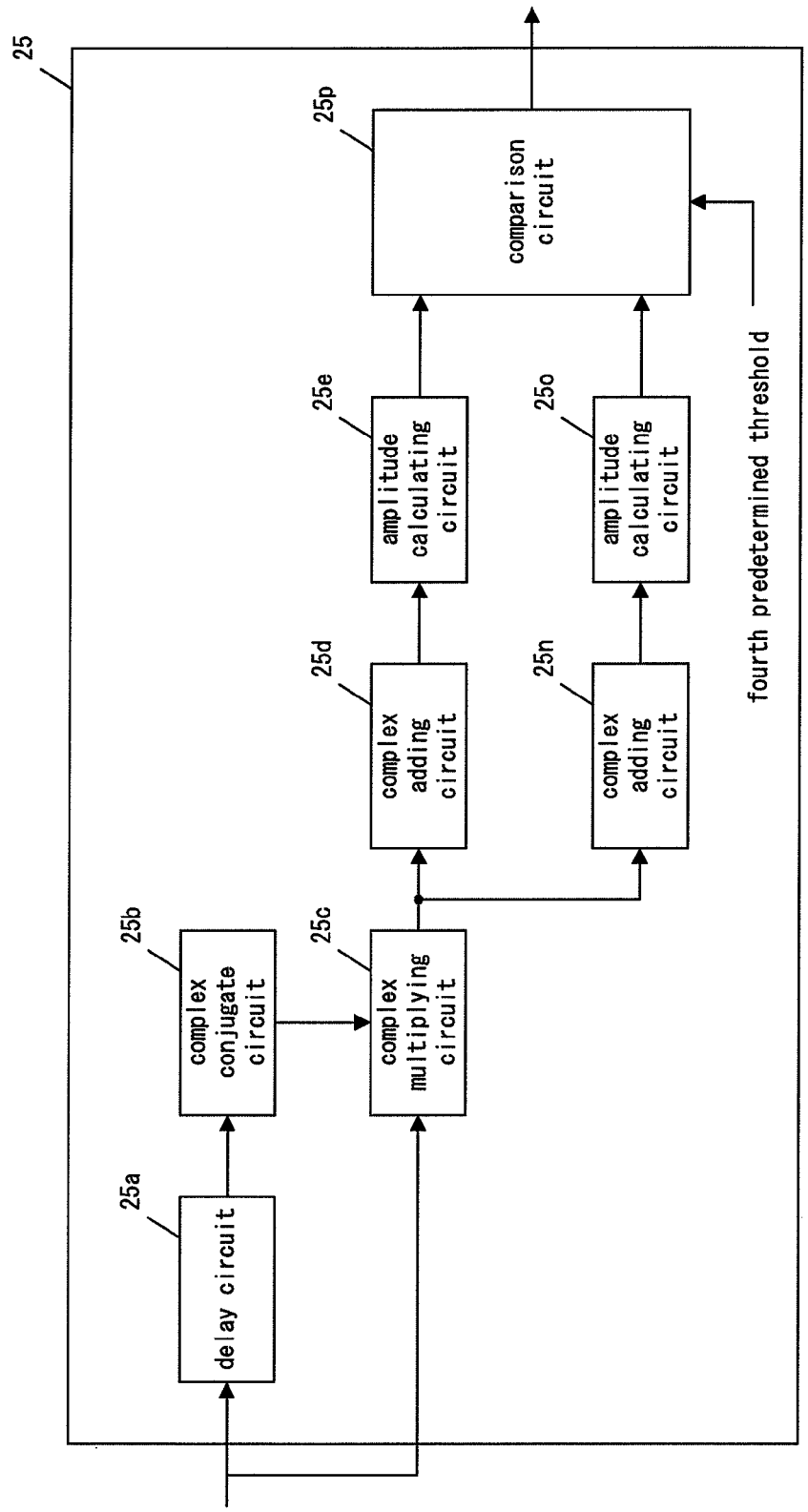
FIG. 13 is a block diagram of the first judging unit in Embodiment 3 according to the present invention.

FIG. 13 is a block diagram of the first judging unit in Embodiment 3 according to the present invention. It is assumed that the second judging unit 35 has the same arrangement. The elements being attached with the same symbol as FIG. 12 have the same functions as explained referring to FIG. 12.

The output of the complex multiplying circuit 25c is inputted into the complex adding circuit 25d and the complex adding circuit 25n, respectively. The complex adding circuit 25d extracts a pilot carrier from a carrier group to perform complex adding, and the amplitude calculating circuit 25e calculates the amplitude of the pilot carrier.

On the other hand, the complex adding circuit 25n extracts a data carrier from the carrier group to perform complex adding, and the amplitude calculating circuit 25o calculates the amplitude of the data carrier. The comparison circuit 25p integrates amplitude values of a predetermined numbers of pilot carriers, the amplitude values being calculated by the amplitude calculating circuit 25e. Furthermore, the comparison circuit 25p integrates amplitude values of a predetermined numbers of data carriers, the amplitude values being calculated by the amplitude calculating circuit 25o.

Since the pilot carriers have the same amplitude and phase ideally, an integrated value of the amplitude value of pilot carriers comes to have a fixed size proceeding with time. On the other hand, since the amplitude and phase of pilot carriers tend to become random when a receiving status is bad, the integrated value tends to become small.

On the other hand, data carriers have random amplitude and phase. When the complex adding circuit 25n continues to add vectors, the integrated value of the output of the complex adding circuit 25n (namely, the amplitude value of data carriers) approaches the value of "0."

The comparison circuit 25p compares the integrated value of amplitude values of pilot carriers with the integrated value of amplitude values of data carriers, the pilot carriers and data carriers being included in the carrier group. Furthermore, the comparison circuit 25p compares the difference between the integrated value of pilot carriers and the integrated value of data carriers with a forth threshold.

When the receiving status is good, the integrated value of pilot carriers must become sufficiently greater than the integrated value of data carriers. For this reason, when the integrated value of pilot carriers greater than the integrated value of data carrier, and further when the difference there-between is greater than the fourth predetermined threshold, the comparison circuit 25p judges this branch as an "operating branch." On the contrary, when the difference there-between is not greater than the forth predetermined threshold, this branch is judged as a "stopping branch."

Thus, comparing a predetermined carrier number of the integrated values of amplitude values of data carriers and pilot carriers enables to judge receiving status with high accuracy.

In Embodiment 3, four examples of judging a receiving status are explained. The present invention is not limited to these examples.

The first judging unit 25 and the second judging unit 35 output a judgment result judged according to the above process to the control unit 10. As explained in Embodiments 1 and 2, the control unit 10 controls the first branch 5 and the second branch 6 in response to the judgment result. That is, a stored value of a branch judged as a stopping branch is initialized, and clock signals of this branch is stopped or reduced.

The diversity receiving apparatus 1 in Embodiment 3 can easily and precisely judge the receiving status of the first branch 5 and the second branch 6. The control based on this judgment result enables to prevent deterioration of the quality of reception of diversity receiving and to reduce power consumption.

(Embodiment 4)

Next, Embodiment 4 will now be explained referring to FIG. 14.

Figure 14:
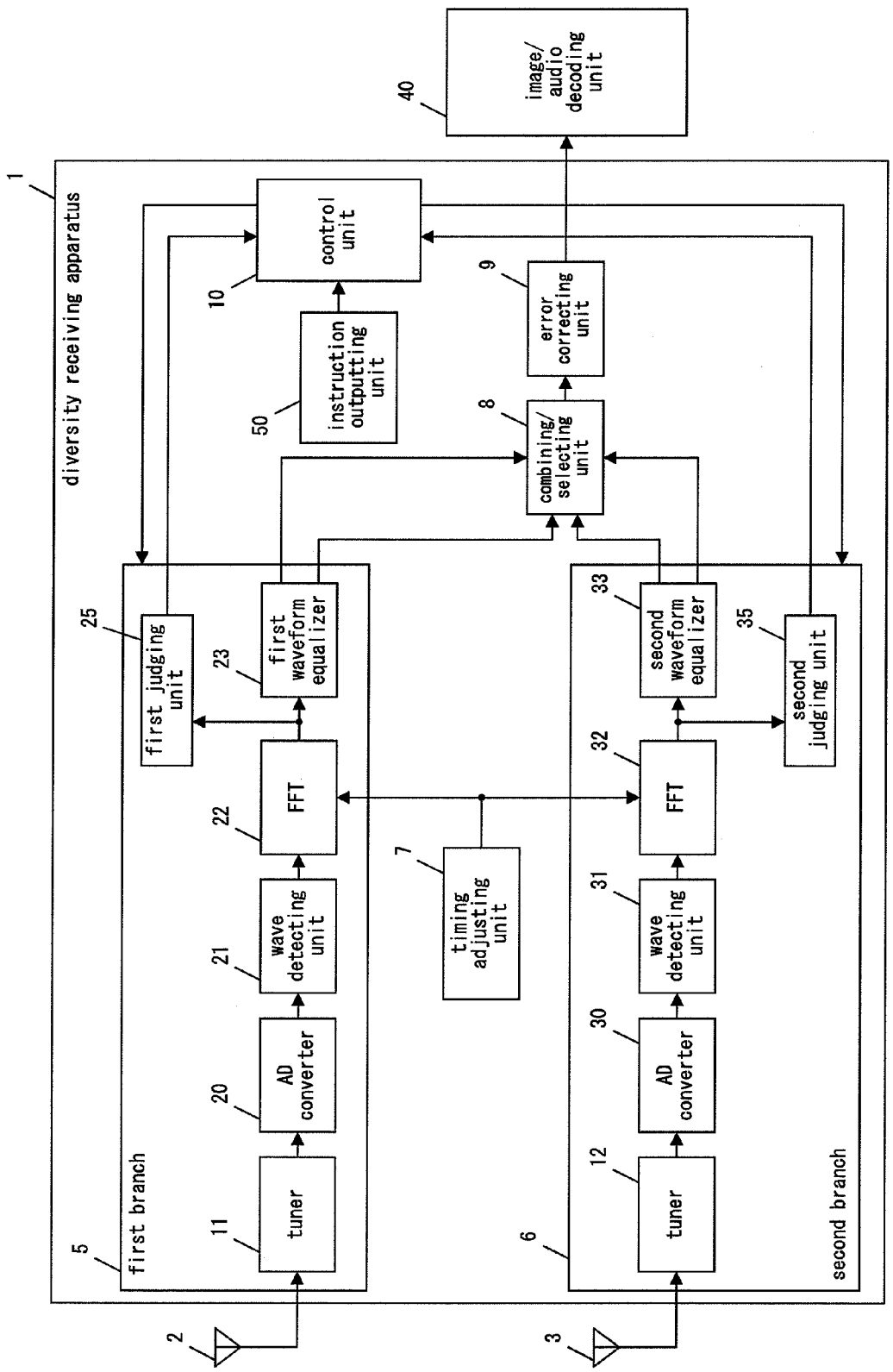
FIG. 14 is a block diagram of a diversity receiving apparatus in Embodiment 4 according to the present invention.

FIG. 14 is a block diagram of a diversity receiving apparatus in Embodiment 4 according to the present invention.

An instruction outputting unit 50 is additionally provided with the diversity receiving apparatus 1 shown in FIG. 1. The elements being attached with the same symbol as FIG. 1 have the same functions as explained referring to FIG. 1.

The instruction outputting unit 50 instructs the control unit 10 to start operation of a branch that has been a stopping branch. For example, when a user activates a run button from the outside of the diversity receiving apparatus 1, the instruction outputting unit 50 outputs a generated starting signal to the control unit 10.

The control unit 10 resumes operation of the "stopping branch" in response to the instruction signal concerning starting.

For example, it is assumed that the first branch 5 is a stopping branch and the second branch 6 is an operating branch. In response to an instruction signal for resuming the first branch of a stopping branch, the control unit 10 cancels the clock control signal 102, and then changes a clock signal to an original frequency signal. Next, the control unit 10 cancels the branch reset signal 101, and then cancels initializing a stored value of the branch. The cancellation causes a memory and a flip-flop, which are included in the branch, to newly start storing values generated by calculation.

Thus first, the clock signal is resumed, and next, initialization is canceled. Therefore, malfunction in a branch caused by transforming from a stopping branch to an operating branch can be prevented. As explained in Embodiment 2, since the amount of frequency-offset stored by the correcting unit before initialization is retained not being initialized, the tuners 11 and 12 and the wave detecting units 21 and 31 can immediately operate.

The above diversity receiving apparatus enables to resume operation of a branch that was judged as a stopping branch and that has stopped its operation, if necessary. That is, the diversity receiving apparatus with high usability can be realized.

The case where a stopping branch is wanted to be resumed, for example, is a case where the receiving environment becomes better and diversity receiving using also a branch stopped by a user is wanted to be restarted, a case where receiving status using only one branch is not good and diversity receiving is wanted to be restarted, or the like.

According to control from the user, the instruction outputting unit 50 may output a stopping instruction signal for making an operating branch compulsorily stop to the control unit 10.

This may be used, for example, in a case where receiving environment for diversity receiving becomes deteriorated, a case where good receiving environment is obtained with only one branch and power consumption is wanted to be reduced, or the like.

Thus, receiving status for every branch is judged, clock signals for a branch judged as a branch in a bad receiving status are reduced or stopped, thereby reducing power consumption. Prior to reducing/stopping the clock signals, initializing a stored value is performed, thereby preventing malfunction after resuming.

In Embodiments 1 to 4, the diversity receiving apparatus 1 provided with the first branch 5 and the second branch 6 has been explained as an example. Three or more branches, however, may be provided.

A part or all of the diversity receiving apparatus 1 may be composed of hardware, software, or the both. A part or all of the diversity receiving apparatus 1 may be composed of a semiconductor integrated circuit.

When being composed of software, a processor, an ROM, an RAM, or the like are provided, thereby performing necessary process.

A CPU loads program stored by the ROM and/or the RAM. Next, the CPU uses the loaded program, and performs receiving an OFDM signal, demodulating the OFDM signal, judging a receiving status, and process for diversity receiving.

In addition to non-portable televisions, AV equipment, personal computers, or the like, the diversity receiving apparatus 1 is mounted on mobile terminals (personal digital assistants, cellular phones, car-mounted televisions, car-navigation systems, portable televisions, portable radios, book type personal computers) and is utilized. This is especially and preferably used for electronic equipment required both improvement in quality of reception and low power consumption.

Industrial Applicability

The present invention can be preferably used, for example, in the field of the diversity receiving apparatus included in portable terminals and/or mobile terminals for receiving digital terrestrial television services, or the like.

The invention claimed is:

1. A diversity receiving apparatus, comprising:
a first branch operable to decode a frequency multiplexing signal in which a carrier group including a data carrier and a pilot carrier has been multiplexed, thereby outputting a first data carrier and a first pilot carrier;
a second branch operable to decode a frequency multiplexing signal in which a carrier group including a data carrier and a pilot carrier has been multiplexed, thereby outputting a second data carrier and a second pilot carrier;
a timing adjusting unit operable to synchronize processing timing for a carrier group decoded by said first branch and a carrier group decoded by said second branch;
a combining/selecting unit operable to combine/select the first data carrier and/or the second data carrier; and
a control unit operable to control stopping and starting operation of at least one of the first branch and the second branch according to at least one of a receiving status of the first branch and a receiving status of second branch,
wherein said control unit initializes a stored value stored by the stopping branch, and reduces clock signals of the stopping branch.

2. A diversity receiving apparatus as defined in claim 1, further comprising:
a first judging unit operable to judge the receiving status of the first branch to output a first judgment result to said control unit; and
a second judging unit operable to judge the receiving status of the second branch to output a second judgment result to said control unit.

3. A diversity receiving apparatus as defined in claim 2, wherein said first judging unit judges whether the first branch is a stopping branch or an operating branch according to the receiving status of the first branch, and
wherein said second judging unit judges whether the second branch is a stopping branch or an operating branch according to the receiving status of the second branch.

4. A diversity receiving apparatus as defined in claim 3, wherein said first judging unit calculates an amplitude value of the first pilot carrier at each of a first timing and a second timing after the first timing, thereby judging that said first branch is an operating branch when the amplitude value at the second timing is greater than the sum of the amplitude value at the first timing and a predetermined threshold, and judging that said first branch is a stopping branch when the amplitude value at the second timing is not greater than the sum of the amplitude value at the first timing and the predetermined threshold, and
wherein said second judging unit calculates an amplitude value of the second pilot carrier at each of a first timing and a second timing after the first timing, thereby judging that said second branch is an operating branch when the amplitude value at the second timing is greater than the sum of the amplitude value at the first timing and a predetermined threshold, and judging that said second branch is a stopping branch when the amplitude value at the second timing is not greater than the sum of the amplitude value at the first timing and the predetermined threshold.

5. A diversity receiving apparatus as defined in claim 3, wherein said first judging unit calculates an amplitude value of the first pilot carrier at each of a first timing and a second timing after the first timing, thereby judging that said first branch is an operating branch when the amplitude value at the second timing is greater than the amplitude value at the first timing, and judging that said first branch is a stopping branch when the amplitude value at the second timing is not greater than the amplitude value at the first timing, and
wherein said second judging unit calculates an amplitude value of the second pilot carrier at each of a first timing and a second timing after the first timing, thereby judging that said second branch is an operating branch when the amplitude value at the second timing is greater than the amplitude value at the first timing, and judging that said second branch is a stopping branch when the amplitude value at the second timing is not greater than the amplitude value at the first timing.

6. A diversity receiving apparatus as defined in claim 3, wherein said first judging unit integrates amplitude values of a predetermined number of first pilot carriers, and amplitude values of a predetermined number of first data carriers, thereby judging that the first branch is an operating branch when an integrated value of the first pilot carriers is greater than an integrated value of the first data carriers, and judging that the first branch is a stopping branch when the integrated value of the first pilot carriers is not greater than the integrated value of the first data carriers, and
wherein said second judging unit integrates amplitude values of a predetermined number of second pilot carriers, and amplitude values of a predetermined number of second data carriers,
thereby judging that the second branch is an operating branch when an integrated value of the second pilot carriers is greater than an integrated value of the second data carriers, and judging that the second branch is a stopping branch when the integrated value of the second pilot carriers is not greater than the integrated value of the second data carriers.

7. A diversity receiving apparatus as defined in claim 1, wherein said control unit reduces clock signals of the stopping branch after initializing a stored value stored by the stopping branch.

8. A diversity receiving apparatus as defined in claim 1, wherein each of said first branch and said second branch comprises a correcting unit operable to correct an amount of time-frequency off-set with respect to the frequency multiplexing signal, and
wherein said control unit reduces clock signals of the stopping branch after initializing a stored value stored by the stopping branch while retaining the amount of time-frequency off-set stored by the stopping branch.

9. A diversity receiving apparatus as defined in claim 1, wherein the reducing the clock signals includes stopping the clock signals.

10. A diversity receiving apparatus as defined in claim 1, wherein, when said control unit receives an instruction signal for resuming the stopping branch, said control unit releases the initializing after resuming operation of the clock signal based on the instruction signal.

11. A diversity receiving apparatus as defined in claim 1, wherein each of said first branch and said second branch comprises:
a tuner operable to receive a predetermined bandwidth of the frequency multiplexing signal to output a received signal;
an analog-to-digital converter operable to convert an analog signal of the received signal into a digital signal of the received signal;
a detection unit operable to detect an output from said analog-to-digital converter; and
a time-frequency converting unit operable to convert a signal along to a time axis of an output from said detection unit into a signal along to a frequency axis.

12. A diversity receiving apparatus as defined in claim 1, wherein the frequency multiplexing signal is an orthogonal frequency division multiplexing signal.

13. A diversity receiving method, comprising:
preparing: a first branch operable to decode a frequency multiplexing signal in which a carrier group including a data carrier and a pilot carrier has been multiplexed, thereby outputting a first data carrier and a first pilot carrier; and a second branch operable to decode a frequency multiplexing signal in which a carrier group including a data carrier and a pilot carrier has been multiplexed, thereby outputting a second data carrier and a second pilot carrier;
synchronizing processing timing for a carrier group decoded by the first branch and a carrier group decoded by the second branch;
combining/selecting the first data carrier and/or the second data carrier; and
controlling stopping and starting operation of at least one of the first branch and the second branch according to at least one of a receiving status of the first branch and a receiving status of second branch,
wherein said controlling includes initializing a stored value stored by the stopping branch, and reducing clock signals of the stopping branch.

* * * * *